United States Patent
Raichart

(10) Patent No.: US 10,512,219 B2
(45) Date of Patent: Dec. 24, 2019

(54) ROTARY PLANT STRIPPER AND RELATED METHODS

(71) Applicant: Cullen Raichart, San Diego, CA (US)

(72) Inventor: Cullen Raichart, San Diego, CA (US)

( * ) Notice: Subject to any disclaimer, the term of this patent is extended or adjusted under 35 U.S.C. 154(b) by 363 days.

(21) Appl. No.: 15/253,734

(22) Filed: Aug. 31, 2016

(65) Prior Publication Data

US 2018/0054973 A1   Mar. 1, 2018

(51) Int. Cl.
*A01D 46/00* (2006.01)

(52) U.S. Cl.
CPC .................... *A01D 46/00* (2013.01)

(58) Field of Classification Search
CPC ...................................... A01D 46/00
USPC ...................................... 47/1.01 D
See application file for complete search history.

(56) References Cited

U.S. PATENT DOCUMENTS

| | | | | |
|---|---|---|---|---|
| 2,408,767 A * | 10/1946 | Fleming | .................. | B43L 23/02 144/28.5 |
| 2,523,663 A * | 9/1950 | Milne | ..................... | B43L 23/04 144/28.71 |
| 2,561,438 A * | 7/1951 | Duchesneau | ........... | B43L 23/02 144/28.5 |
| 2,592,833 A * | 4/1952 | Swanson | .................. | A01G 5/00 131/314 |
| 3,556,182 A * | 1/1971 | Tanigami | ................ | B43L 23/02 144/28.5 |
| 3,612,515 A * | 10/1971 | Bergeson | ............. | G03D 13/003 193/2 R |
| 3,913,644 A * | 10/1975 | Braun | ....................... | B27L 1/04 144/208.1 |
| 4,155,643 A * | 5/1979 | Ladds | .................... | B65H 31/02 271/207 |
| 6,016,626 A * | 1/2000 | Auer | ...................... | A01G 17/02 47/1.01 R |
| 8,225,827 B2 * | 7/2012 | Dunlap | .................. | B43L 23/00 144/28.6 |
| 9,956,812 B2 * | 5/2018 | Schumacher | .......... | B43L 23/02 |

FOREIGN PATENT DOCUMENTS

CA         2985587 A1 *  1/2018  ............... A01G 3/00

* cited by examiner

*Primary Examiner* — Tien Q Dinh
*Assistant Examiner* — Ebony E Evans
(74) *Attorney, Agent, or Firm* — Buche & Associates, P.C.; John K. Buche; Bryce A. Johnson

(57) ABSTRACT

Disclosed is a plant stripper for separating buds or fruit from the stems or branches of a plant. In one embodiment, the plant stripper is defined by a housing that contains a face plate, bladed rollers, and motor and gear system for counter turning the rollers. In operation, a plant stem bearing buds or fruit may be provided through a plant hole in the face plate and gripped by the counter turning rollers so that continued counter turning of the rollers pulls the stems or plants through the plant hole of the face plate. Suitably, the plant hole is gauged so that only the stem may pass through the hole but not the buds or fruit whereby the buds or fruit of the plant are stripped from the plant via action of the stem through the plant hole. In one embodiment, the plant stripper features a guide tray for catching stripped buds or fruit and guiding the same to a collection bin.

5 Claims, 28 Drawing Sheets

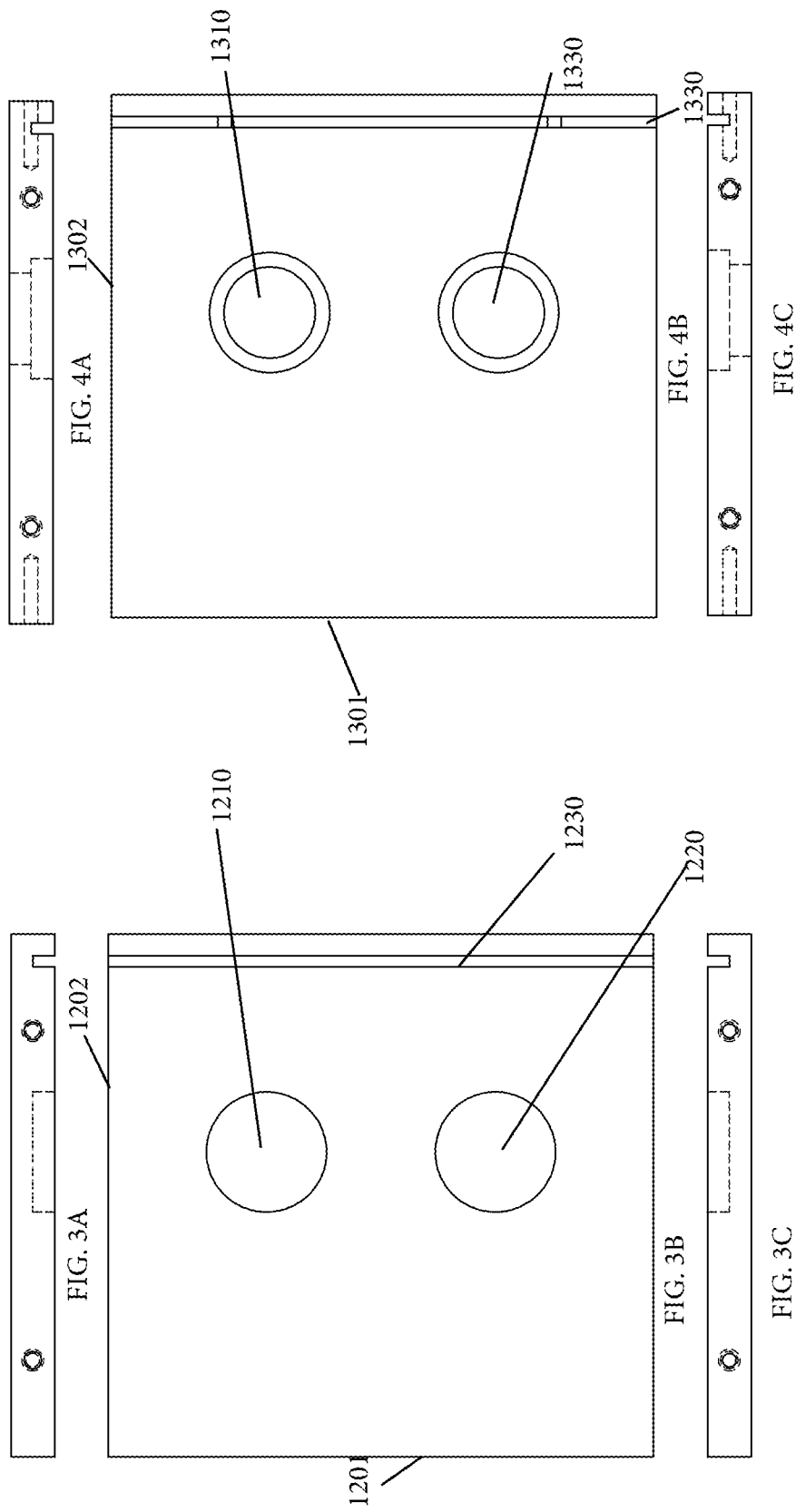

FIG. 5A
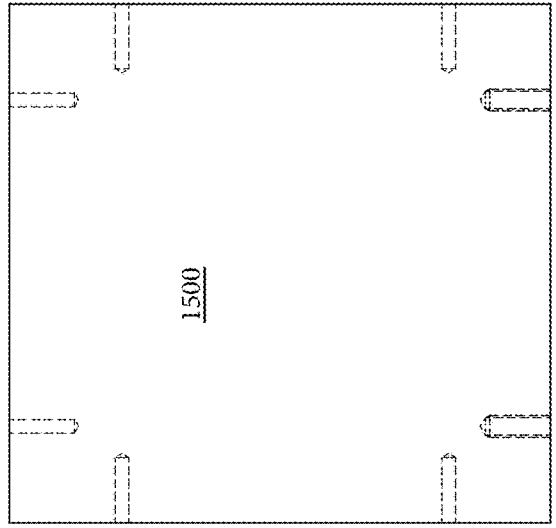
FIG. 5B
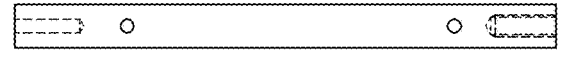
FIG. 5C
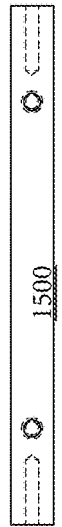
FIG. 5D
FIG. 6A
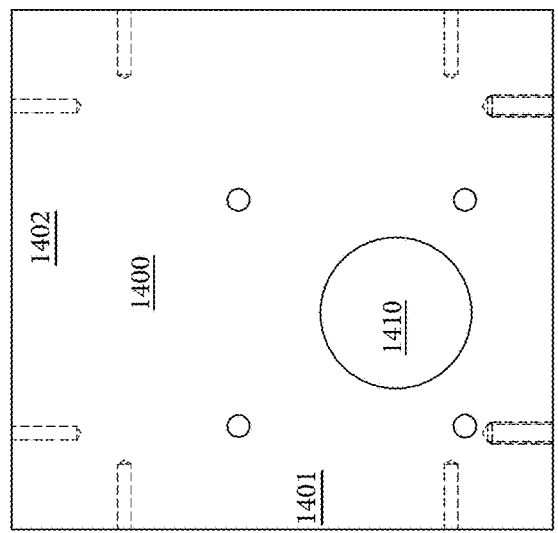
FIG. 6B
FIG. 6C
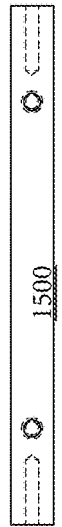
FIG. 6D

1600

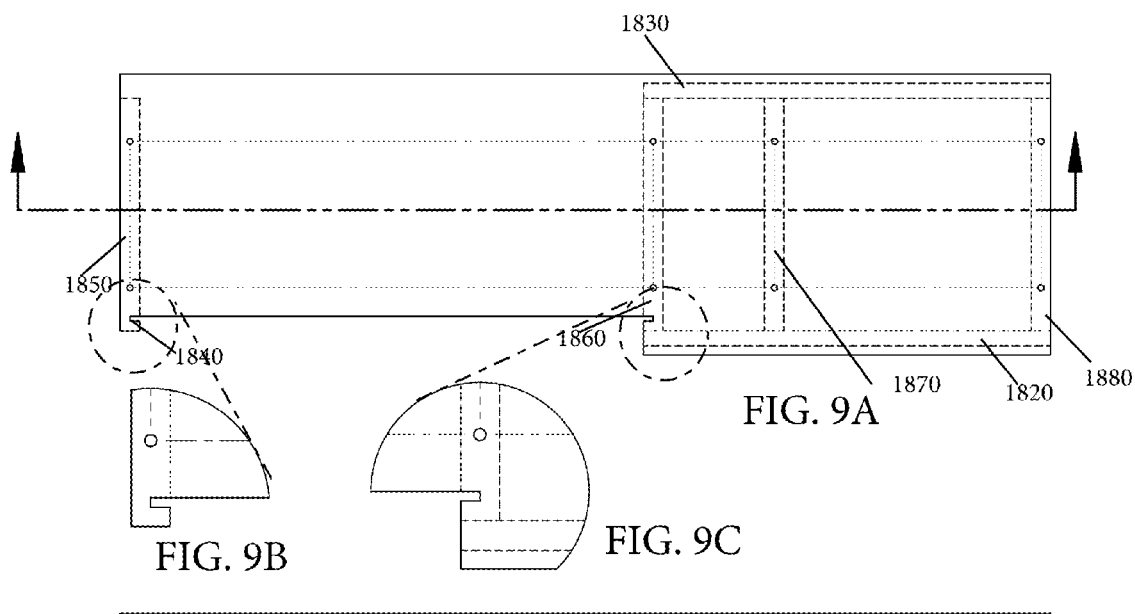
FIG. 9A
FIG. 9B
FIG. 9C
FIG. 9D
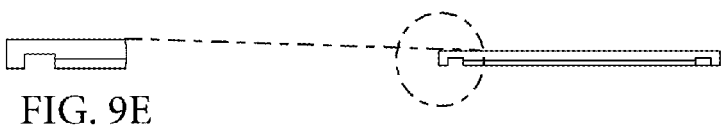
FIG. 9E
FIG. 9F

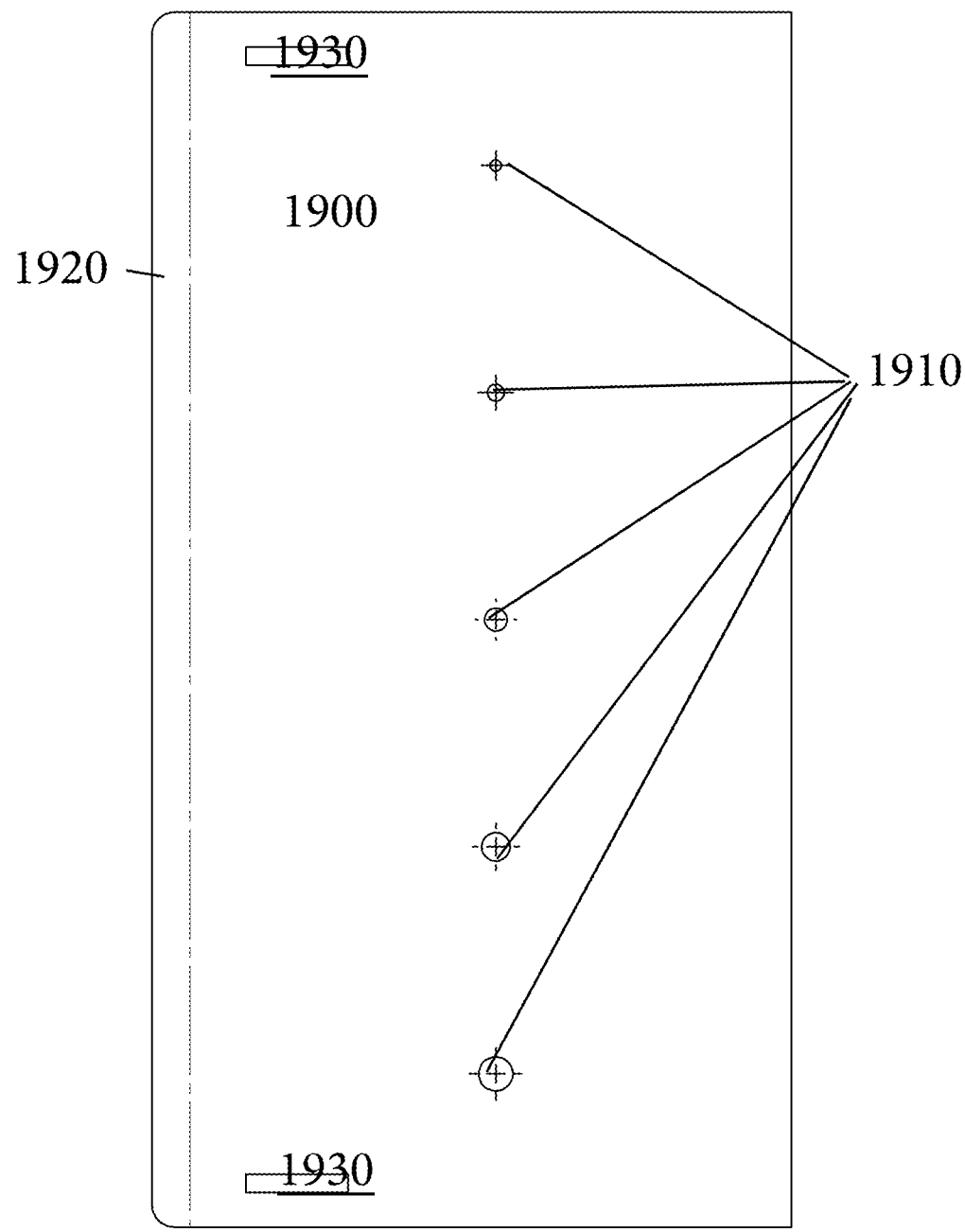

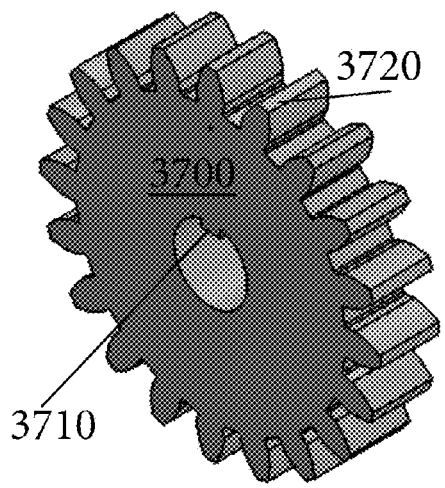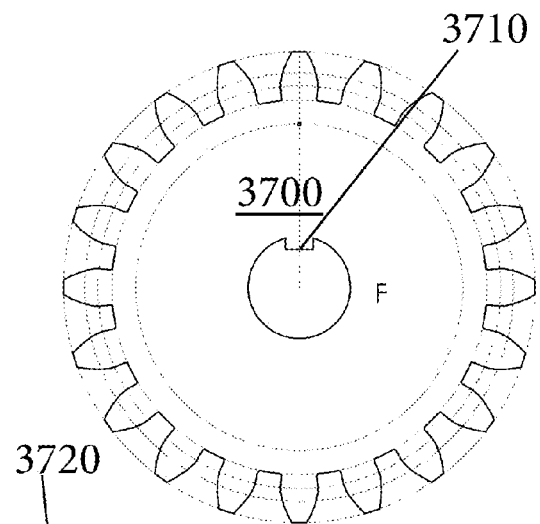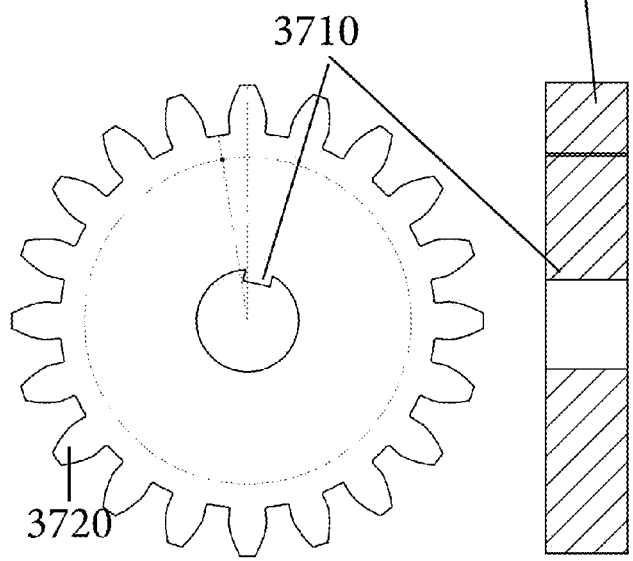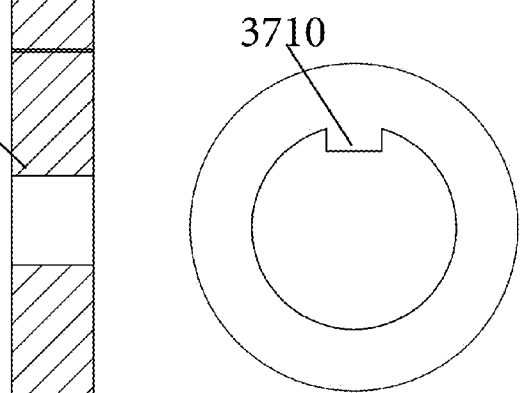
FIG. 13
FIG. 13A
FIG. 13B
FIG. 13C
FIG. 13D

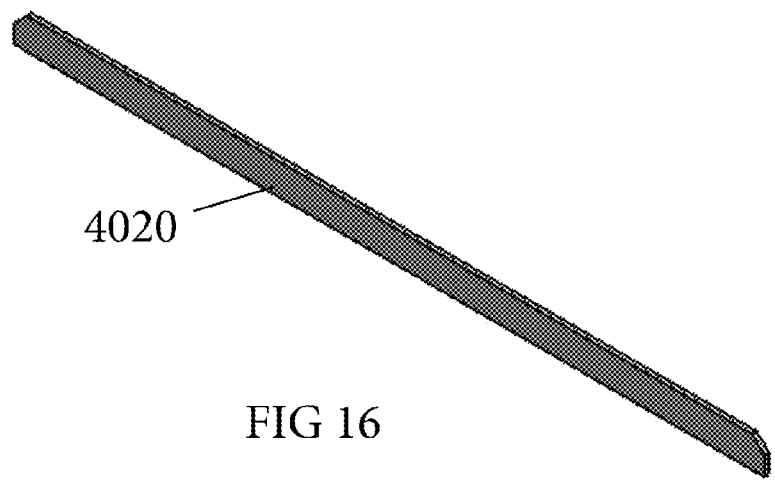
FIG 16
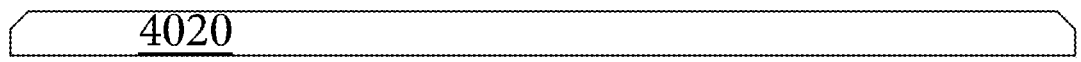
FIG. 16A
4020
FIG. 16B

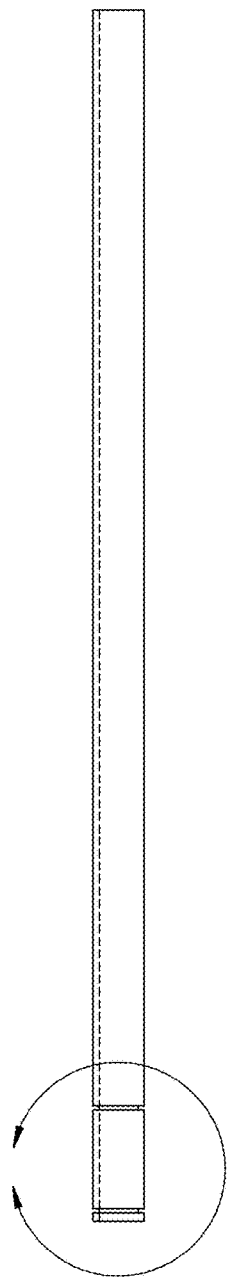
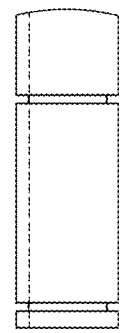
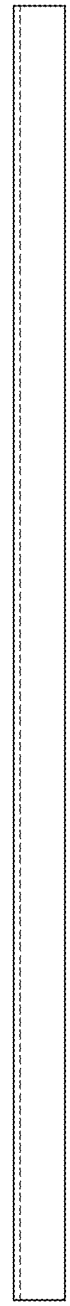
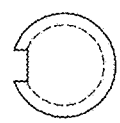
FIG. 17A
FIG. 17B
FIG. 17D
FIG. 17E

ROTARY PLANT STRIPPER AND RELATED METHODS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND AN INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of plant strippers for removing buds or fruit from the stems or branches of plants.

Background of the Invention

Buds and fruit on the stems or branches of plants are frequently harvested by hand. In a typical mode of harvesting, the bud or fruit is griped in one hand while scissors in the other and are used to cut the bud or fruit free from the stem. Alternatively, the stem or branch could be gripped while the scissors cut the bud or fruit free. The harvested fruit is then placed by hand in a collection bin. Harvesting buds or fruit from a plant stem or branch can be tedious, time consuming and painful when done by hand. Thus, a need exits for apparatus and related methods of harvesting the buds or fruit in a timely, efficient, and painless manner.

SUMMARY OF THE INVENTION

In view of the foregoing, an object of this specification is to disclose a plant stripper for separating buds or fruit from the stems or branches of a plant. In one embodiment, the plant stripper is defined by a housing that contains a face plate, bladed rollers, and motor and gear system for counter turning the rollers. In operation, a plant stem bearing buds or fruit may be provided through a plant hole in the face plate and gripped by the counter turning rollers so that continued counter turning of the rollers pulls the stems or plants through the plant hole of the face plate. Suitably, the plant hole is gauged so that only the stem may pass through the hole but not the buds or fruit whereby the buds or fruit of the plant are stripped from the plant via action of the stem through the plant hole. In one embodiment, the plant stripper features a guide tray for catching stripped buds or fruit and guiding the same to a collection bin.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which:

FIG. 3A is a side view of the right outside plate 1200;
FIG. 3B is a top view of the right outside plate 1200;
FIG. 3C is another side view of the right outside plate 1200;
FIG. 4A is a side view of the right inside plate 1300;
FIG. 4B is a top view of the right inside plate 1300;
FIG. 4C is another side view of the right inside plate 1300;
FIG. 5A is a side view of the left inside plate 1400;
FIG. 5B is a top view of the left inside plate 1400;
FIG. 5C is a rear view of the left inside plate 1400;
FIG. 5D is another side view of the left inside plate 1400;
FIG. 6A is a side view of the left outside plate 1500;
FIG. 6B is a top view of the left outside plate 1500;
FIG. 6C is a rear view of the let outside plate 1500;
FIG. 6D is another side view of the left outside plate 1500;
FIG. 9A is a top view of the top plate 1800;
FIG. 9B is a zoom-in view of the face plate groove 1840;
FIG. 9C is another zoom-in view of the face plate groove 1840;
FIG. 9D is a side view of the top plate 1800;
FIG. 9E is a zoom in view of an right inside plate groove 1850;
FIG. 9F is a side view of the tope plate 1800;
FIG. 10A is a side view of the face plate 1900;

FIG. 10B is a front view of the face plate 1900;

FIG. 13 is a perspective view of a gear 3700 of the plant stripper 1000;

FIG. 13A is a front view of the gear 3700;

FIG. 13B is a rotated view of the gear 3700;

FIG. 13C is a cross-section of the gear 3700;

FIG. 13D is a zoom-in view of the gear 3700;

FIG. 16 is a perspective view of a blade 4020 of the roller 4000;

FIG. 16A is a side view of the blade 4020;

FIG. 16B is a front view of the blade 4020;

FIG. 17A is a side view of the lower shaft 4200;

FIG. 17B is a zoom-in view of the lower shaft 4200;

FIG. 17D is a side view of the upper shaft 4100 of the plant stripper 1000;

FIG. 17E is an end view of the upper or lower shaft 4100/4200;

Figure 1:
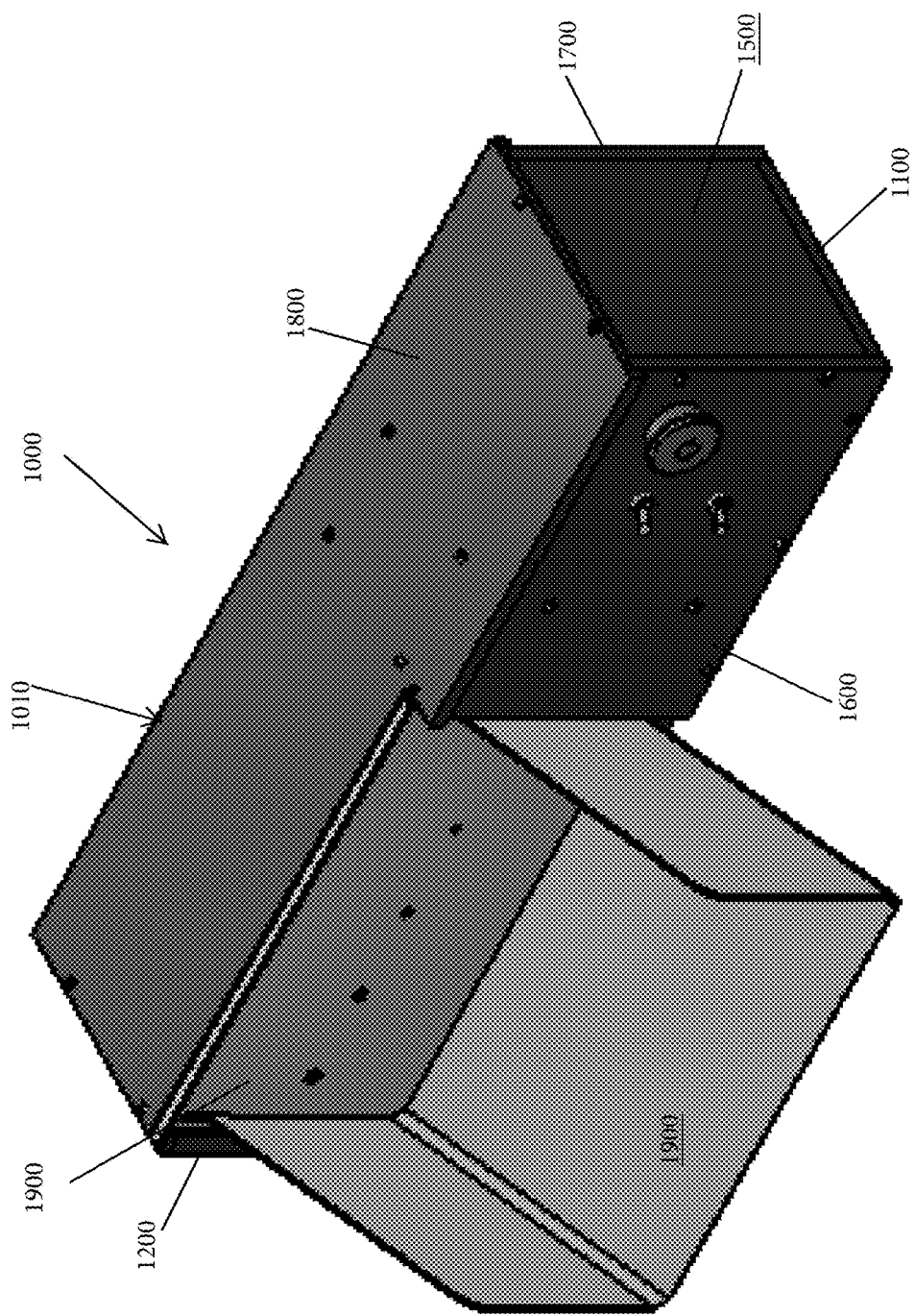
FIG. 1 is a perspective view of a preferred embodiment of a plant stripper 1000.

In the drawings, the numerals represent the following components:

1000 plant stripper;
1100 base;
1110 base screws (Socket countersunck head cap screw);
1120 right outside plate groove;
1130 right inside plate groove;
1140 left inside plate groove;
1150 left outside plate groove;
1200 right outside plate;
1210 top roller receptacle;
1220 bottom roller receptacle;
1230 face plate groove;
1300 right inside plate;
1310 top roller aperture;
1320 bottom roller aperture;
1330 face plate groove;
1400 left inside plate;
1410 motor hole;
1500 left outside plate;
1600 front plate;
1610 front plate screws (socket button head cap screw);
1620 shallow front plate screws (SBHCSCREW 0.165-32x0. 188-HX-N);
1700 rear plate;
1710 rear plate screws (socket button head cap screw);
1720 shallow rear plate screws (SBHCSCREW 0.165-32x0. 188-HX-N);
1730 relay hole
1800 top plate;
1810 top plate screws;
1820 front plate groove;
1830 rear plate groove;
1840 face plate groove;
1850 right outside plate groove;
1860 right inside plate groove;
1870 left inside plate groove;
1880 left outside plate groove;
1900 face plate;
1910 lip;
1920 plant hole;
1930 tray catch;
2000 guide tray;
2010 face plate hook
3000 induction gear motor;
3100 relay (User Library-R-A-700112-RN (70 A 12 V Form A Relay));
3200 2424K15;
3300 gear spacer;
3400 screws (SBHCSCREW 0.25-20x2.25-HX-N);
3500 nuts (HJNUT 0.2500-20-D-N);
3600 emergency stop switch;
3700 gear (20T-0.5t Spur Gear);
3710 gear tongue;
3720 gear teeth;
3800 toggle switches;
3900 97431A350;
4000 roller;
4010 end plate;
4011 shaft tongue;
4012 blade groove;
4020 blade;
4030 roller body;
4100 lower shaft;
4110 shaft groove;
4200 upper shaft;
4300 2342K187; and,
4400 roller spacer.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Disclosed is a plant stripper for separating buds or fruit from the stems or branches of a plant. Generally, the disclosed plant stripper may be defined by a housing that contains a face plate, bladed rollers, and motor and gear system for counter turning the rollers. In use, a plant stem bearing buds or fruit may be provided through a plant hole in the face plate and gripped by the counter turning rollers so that continued counter turning of the rollers pulls the stems or plants through the plant hole of the face plate. Suitably, the plant hole is gauged so that only the stem may pass through the hole but not the buds or fruit whereby the buds or fruit of the plant are stripped from the plant via action of the stem through the plant hole. In one embodiment, the plant stripper features a guide tray for catching stripped buds or fruit and guiding the same to a collection bin.

Figure 1A:
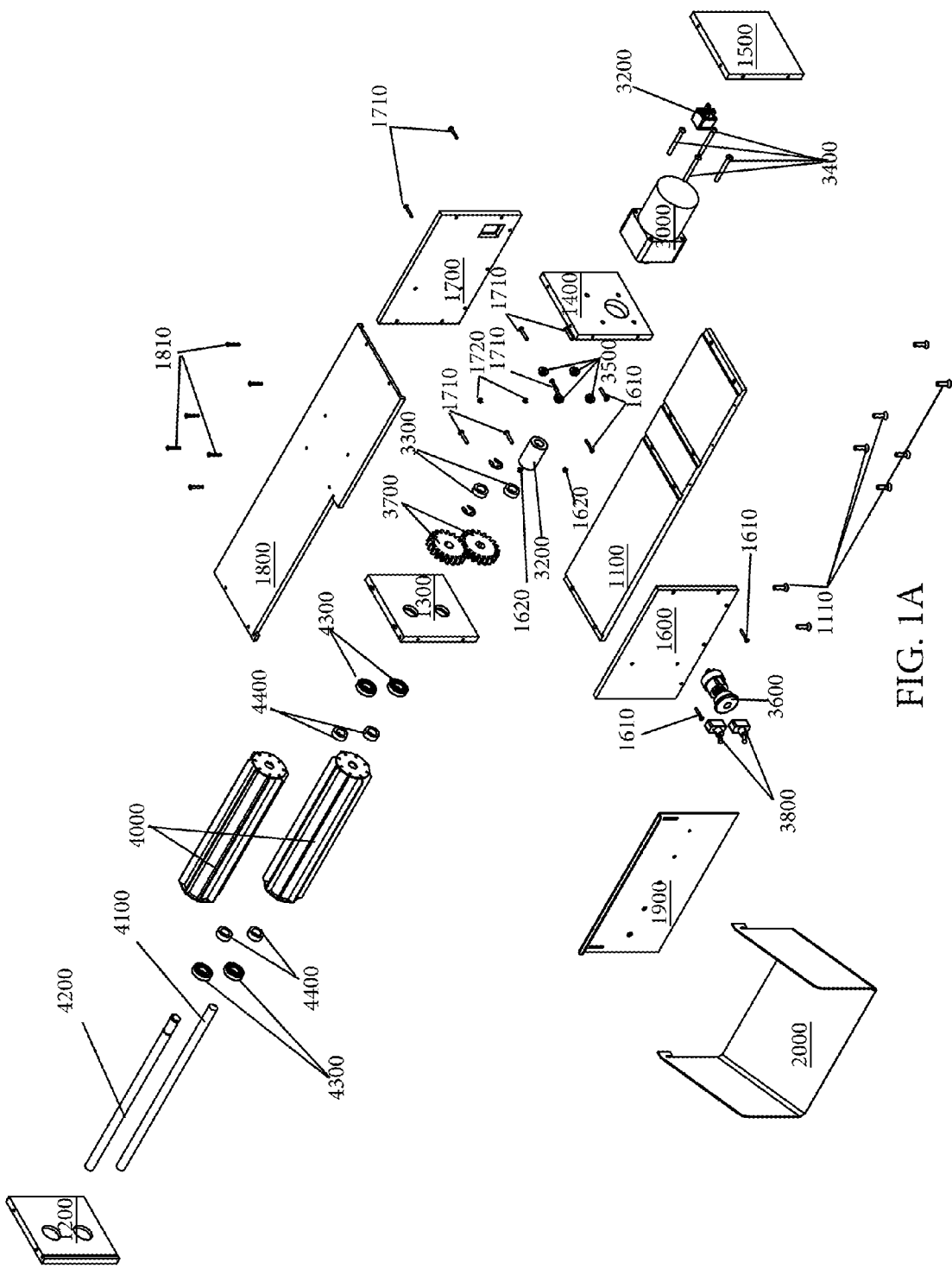
FIG. 1A is an exploded view of the plant stripper 1000 shown in FIG. 1.

FIG. 1 is a perspective view of a preferred embodiment of a plant stripper 1000. FIG. 1A is an exploded view of the plant stripper 1000 shown in FIG. 1. As can be seen in these figures, the plant stripper 1000 is generally defined by a housing 1010. Suitably, the housing 1010 is defined by a base 1100, a right outside plate 1200, a right outside plate (shown in FIGS. 1 and 1A), a right inside plate 1300 (shown in FIG. 1A), left inside plate 1400 (shown in FIG. 1A), a left outside plate 1500 (shown in FIGS. 1 and 1A), a front plate 1600 (shown in FIGS. 1 and 1A), rear plate 1700 (shown in FIGS. 1 and 1A), and a top plate 1800 (shown in FIGS. 1 and 1A). Suitably, the housing externally supports a face plate 1900 and guide tray 2000. Internally, the housing encloses rollers 4000, a motor 3000, and gears 3700 for transferring the motion of the motor to counter rotation of the rollers 4000. More specifically; rollers 4000 are rotatably disposed between the right outside plate 1200 and the right inside plate 1300; a motor 3000 is disposed between the left outside plate 1500 and left inside plate 1400; and, a gear system, including gears 3700, are disposed between the right inside plate 1300 and left inside plate 1400 so that a motion from the motor 3000 is imparted through the left inside plate to the gears 3700 and from the gears 3700 through the right inside plate 1300 to the rollers.

Figure 2:
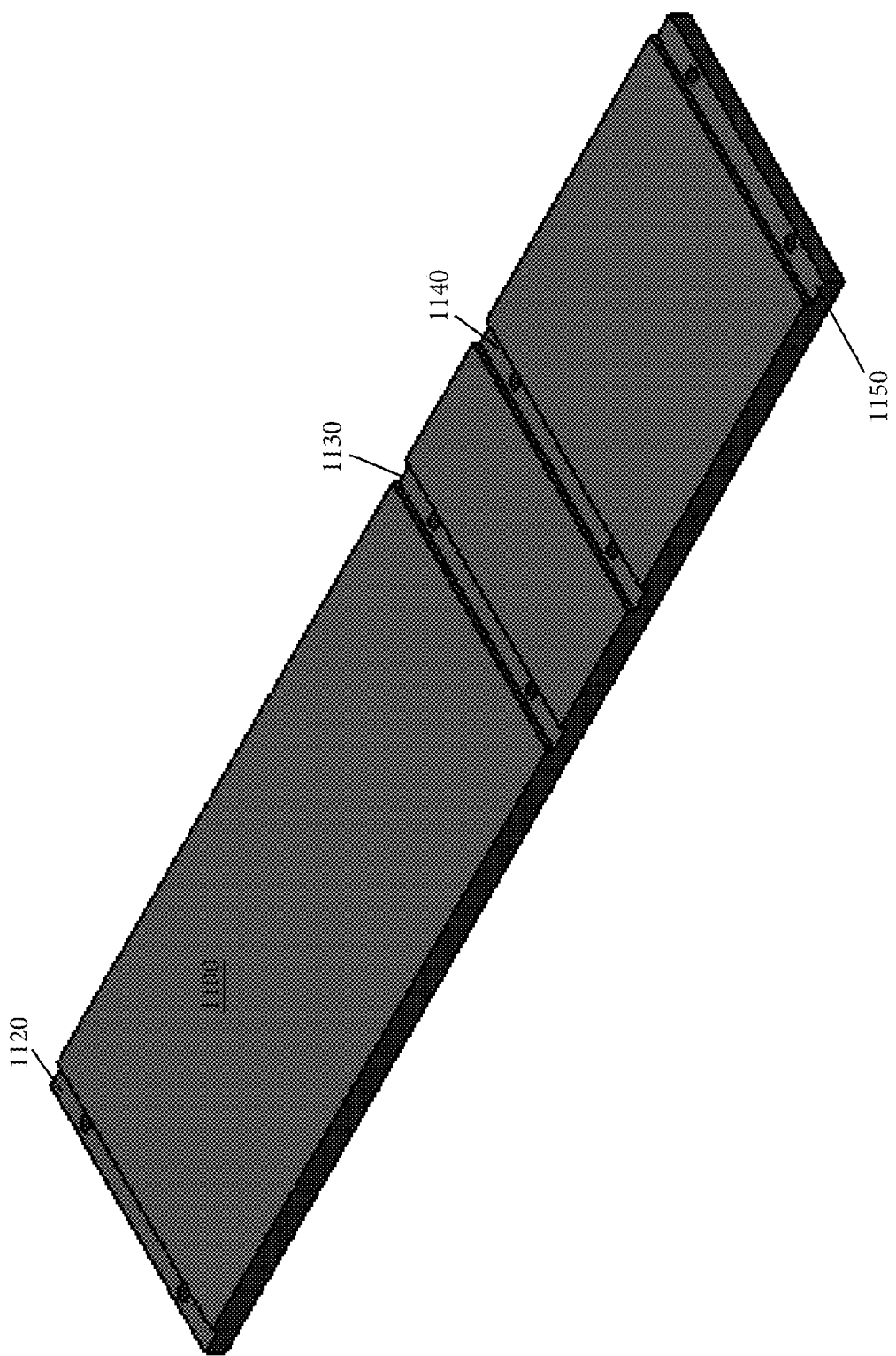
FIG. 2 is a perspective view of a base 1100 of the plant stripper 1000.
Figure 2A:
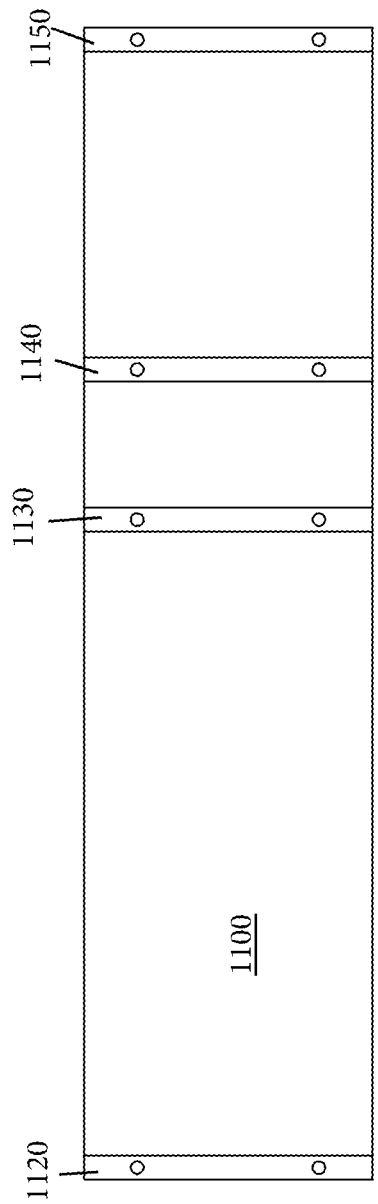
FIG. 2A is a top view of the base 1100.
Figure 2B:
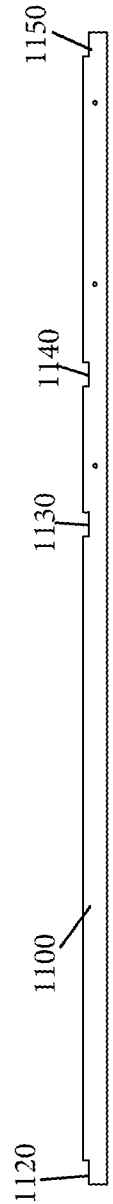
FIG. 2B is a side view of the base 1100.

FIG. 2 is a perspective view of a base 1100 of the plant stripper 1000. FIG. 2A is a top view of the base 1100. FIG. 2B is a side view of the base 1100. As shown in FIGS. 2, 2A, and 2B, the base 1100 may generally be rectangular slab. In a preferred embodiment, the slab is 6.00 inches wide by 24.00 inches long by 0.50 inches thick. Suitably, a right outside plate groove 1120 may be carved into the right end of the base 1100, a right inside plate groove 1130 may be carved into midsection of the base 1100, a left inside plate groove 1140 may be carved into another midsection of the base 11000, and a left outside plate groove 1150 may be carved into the right end of the base. Suitably, each of the grooves 1120, 1130, 1140, and 1150 may be 0.50 inches wide and 0.13 inches deep. In one embodiment, the right inside plate groove 1130 is 13.50 inches from the center of the right outside plate groove 1120 and the left inside plate groove 1140 is 3.13 inches from the right inside plate groove 1130. As discussed later, the grooves 1120, 1130, 1140, 1150 are configured to receive their corresponding plates 1200, 1300, 1400, 1500 in the manner of a tongue and groove fit. As shown, the grooves 1120, 1130, 1140, 1150 and plates 1200, 1300, 1400, 1500 may feature cooperating holes for the passing of screws to bolt the base to the plates 1200, 1300, 1400, 1500 in the grooves 1120, 1130, 1140, 1150.

Figure 3:
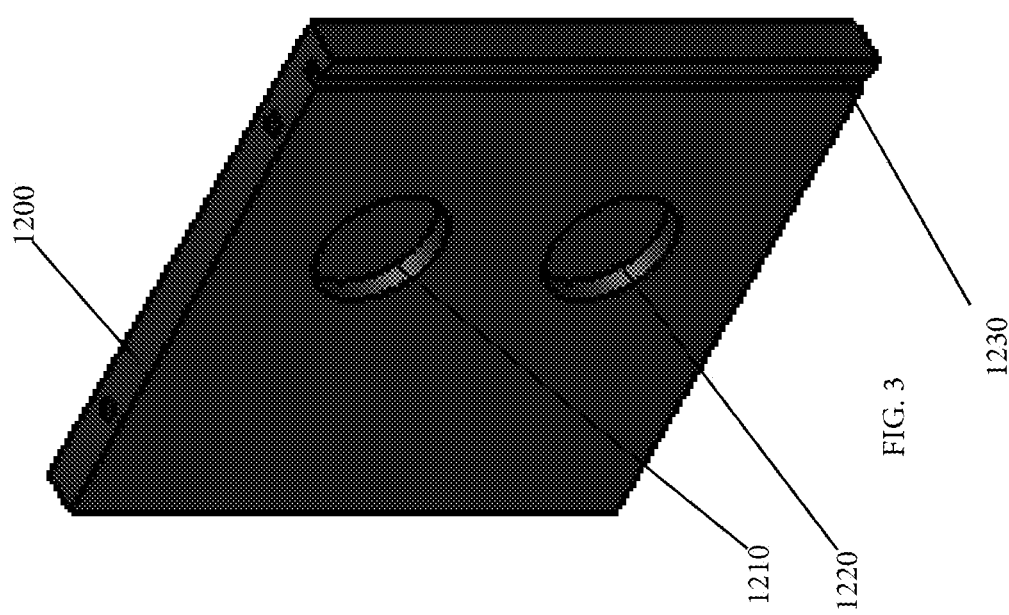
FIG. 3 is a perspective view of a right outside plate 1200 of the plant stripper 1000.

FIG. 3 is a perspective view of a right outside plate 1200 of the plant stripper 1000. FIG. 3A is a side view of the right outside plate 1200. FIG. 3B is a top view of the right outside plate 1200. FIG. 3C is another side view of the right outside plate 1200. Referring to FIGS. 3, 3A, 3B, and 3C, the right outside plate 1200 is generally a square slab with a face plate groove 1230, an upper roller receptacle 1210, and a lower roller receptacle 1220 cut into the its surface. Suitably, the dimensions of the plate 1200 may be 6.25 inches by 6.00 inches by 0.50 inches. The groove may be 0.13 inches wide, 0.25 inches deep, and provided along the plate 5.63 inches from one of the long sides 1201 of the plate 1200. The upper receptacle 1210 may suitably be cut 0.25 inches into the surface of the plate 1200 as a circle with a 1.38 inch diameter where the center of the circle is 3.50 inches from the long side 1201 of the plate 1200 and 1.81 inches from the short side 1202 of the plate 1200. The lower receptacle 1220 may be cut 0.25 inches into the surface of the plate 1200 as a circle with a 1.38 inch diameter where the center of the circle is 3.50 inches from the long side 1201 of the plate 1200 and 2.63 inches from the center of the upper receptacle 1210 (or 4.44 inches from the short side 1202 of the plate 1200). As shown, various holes may be provided to the plate to accommodate screws.

Figure 4:
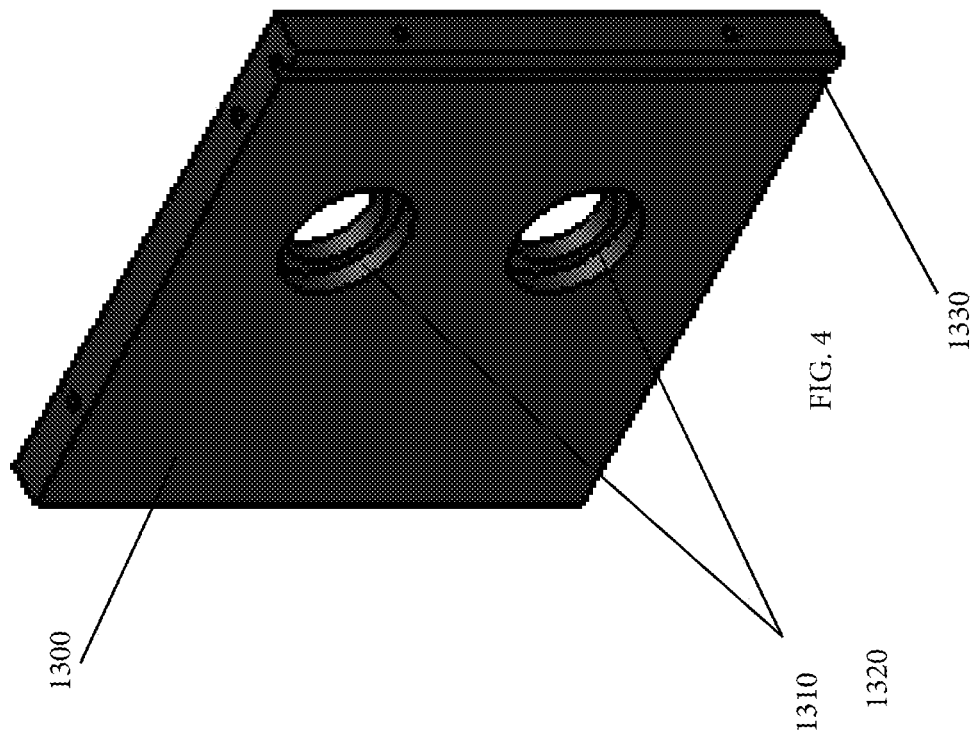
FIG. 4 is a perspective view of a right inside plate 1300 of the plant stripper 1000.

FIG. 4 is a perspective view of a right inside plate 1300 of the plant stripper 1000. FIG. 4A is a side view of the right inside plate 1300. FIG. 4B is a top view of the right inside plate 1300. FIG. 4C is another side view of the right inside plate 1300. Referring to FIGS. 4, 4A, 4B, and 4C, the right inside plate 1300 is generally a square slab with a face plate groove 1330, an upper roller aperture 1310, and a lower roller receptacle 1320 cut into the its surface. Suitably, the dimensions of the plate 1300 may be 6.25 inches by 6.00 inches by 0.50 inches. The groove 1330 may be 0.13 inches wide, 0.25 inches deep, and provided along the plate 5.63 inches from one of the long sides 1301 of the plate 1300. The upper aperture 1310 may suitably be cut 0.25 inches into the surface of the plate 1300 as a circle with a 1.38 inch diameter where the center of the circle is 3.50 inches from the long side 1301 of the plate 1200 and 1.81 inches from the short side 1302 of the plate 1300. The aperture 1310 may be further cut the rest of the way through plate 1300 as a circle with 1.05 diameter concentric to the first circle. The lower aperture 1320 may be cut 0.25 inches into the surface of the plate 1300 as a circle with a 1.38 inch diameter where the center of the circle is 3.50 inches from the long side 1301 of the plate 1300 and 2.63 inches from the center of the upper receptacle 1310 (or 4.44 inches from the short side 1302 of the plate 1300). The aperture 1320 may be further cut the rest of the way through plate 1300 as a circle with 1.05 diameter concentric to the first circle. As shown, various holes may be provided to the plate to accommodate screws.

Figure 5:
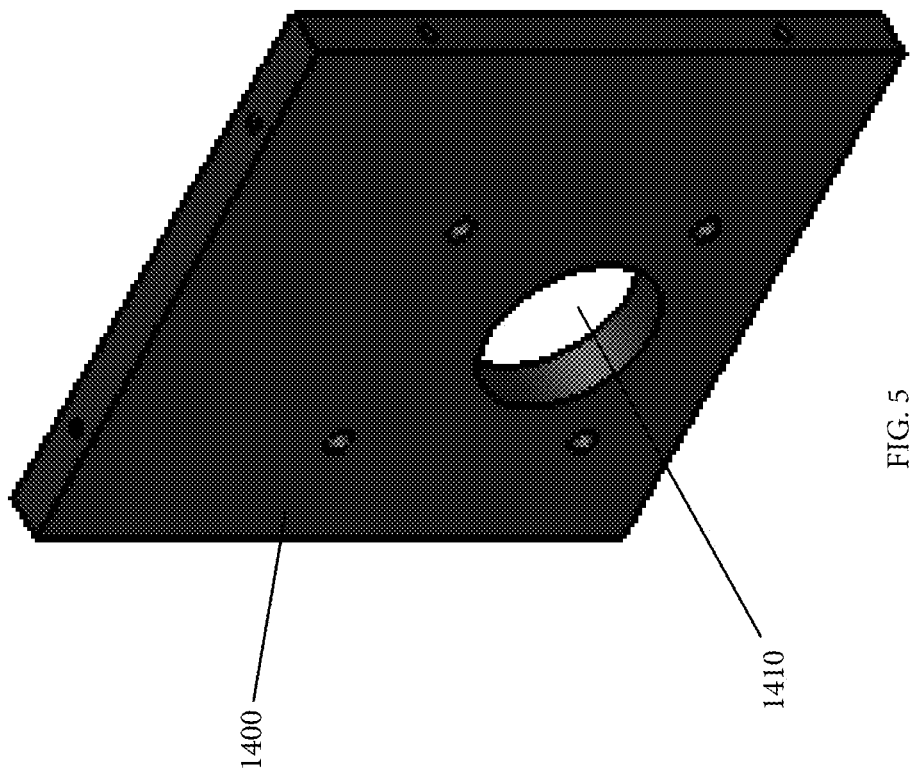
FIG. 5 is a perspective view of a left inside plate 1400 of the plant stripper 1000.

FIG. 5 is a perspective view of a left inside plate 1400 of the plant stripper 1000. FIG. 5A is a side view of the left inside plate 1400. FIG. 5B is a top view of the left inside plate 1400. FIG. 5C is a rear view of the left inside plate 1400. FIG. 5D is another side view of the left inside plate 1400. Referring to FIGS. 5, 5A, 5B, 5C, and 5D the left inside plate 1400 is generally a square slab with a motor hole 1410 cut into the its surface. Suitably, the dimensions of the plate 1400 may be 6.25 inches by 6.00 inches by 0.50 inches. The motor hole 1410 may suitably be cut through the surface of the plate 1400 as a circle with a 1.75 inch diameter where the center of the circle is 2.50 inches from the long side 1401 of the plate 1400 and 4.4 inches from the short side 1402 of the plate 1200. As shown, various holes may be provided to the plate to accommodate screws.

Figure 6:
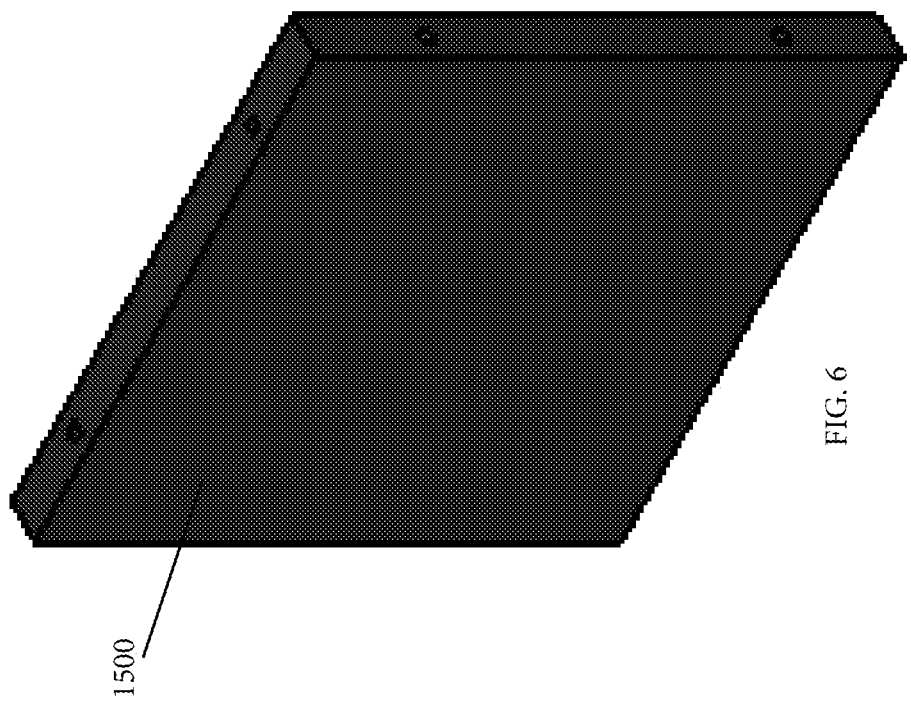
FIG. 6 is a perspective view of a left outside plate 1500 of the plant stripper 1000.

FIG. 6 is a perspective view of a left outside plate 1500 of the plant stripper 1000. FIG. 6A is a side view of the left outside plate 1500. FIG. 6B is a top view of the left outside plate 1500. FIG. 6C is a rear view of the let outside plate 1500. FIG. 6D is another side view of the left outside plate 1500. Suitably, the dimensions of the plate 1500 may be 6.25 inches by 6.00 inches by 0.50 inches. As shown, various holes may be provided to the plate to accommodate screws.

Figure 7:
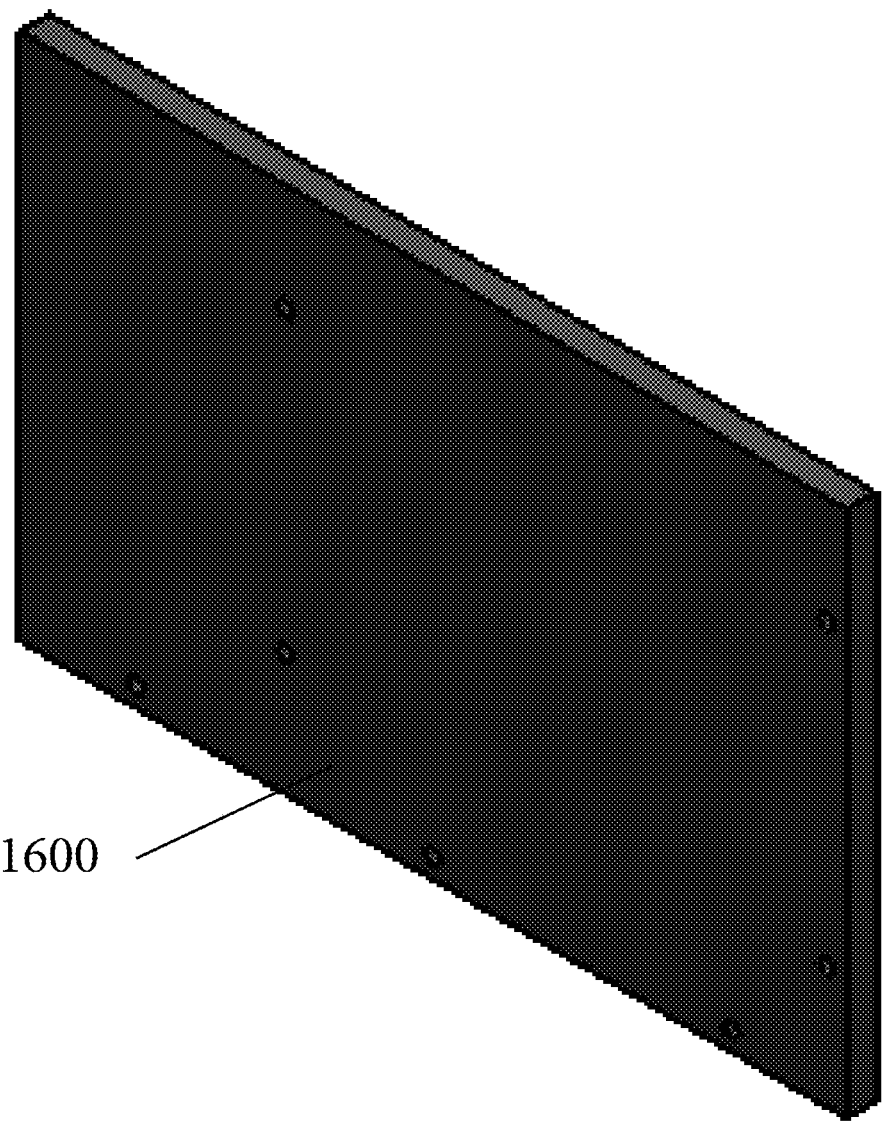
FIG. 7 is a perspective view of a front plate 1600 of the plant stripper 1000.
Figure 7A:
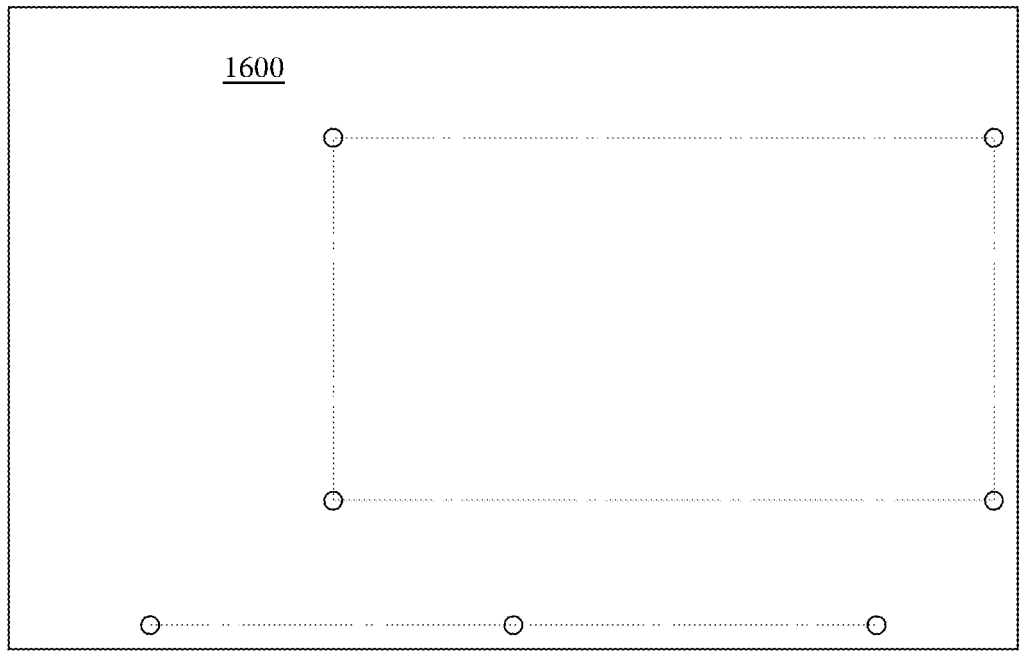
FIG. 7A is a tope view of the front plate 1600.
Figure 7B:
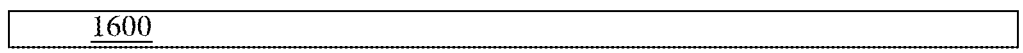
FIG. 7B is a front view of the front plate 1600.

FIG. 7 is a perspective view of a front plate 1600 of the plant stripper 1000. FIG. 7A is a top view of the front plate 1600. FIG. 7B is a side view of the front plate 1600. Suitably, the dimensions of the plate 1600 may be 6.69 inches by 10.50 inches by 0.38 inches. As shown, various holes may be provided to the plate to accommodate screws. Additionally, holes may be provided through the front plate

1600 so that toggle switches 3800 (see FIGS. 1 and 1A) and the emergency motor shut off 3900 (see FIGS. 1 and 1A) may be provided through the face plate to control the motor 3000 within the housing 1010 (see FIGS. 1 and 1A).

Figure 8:
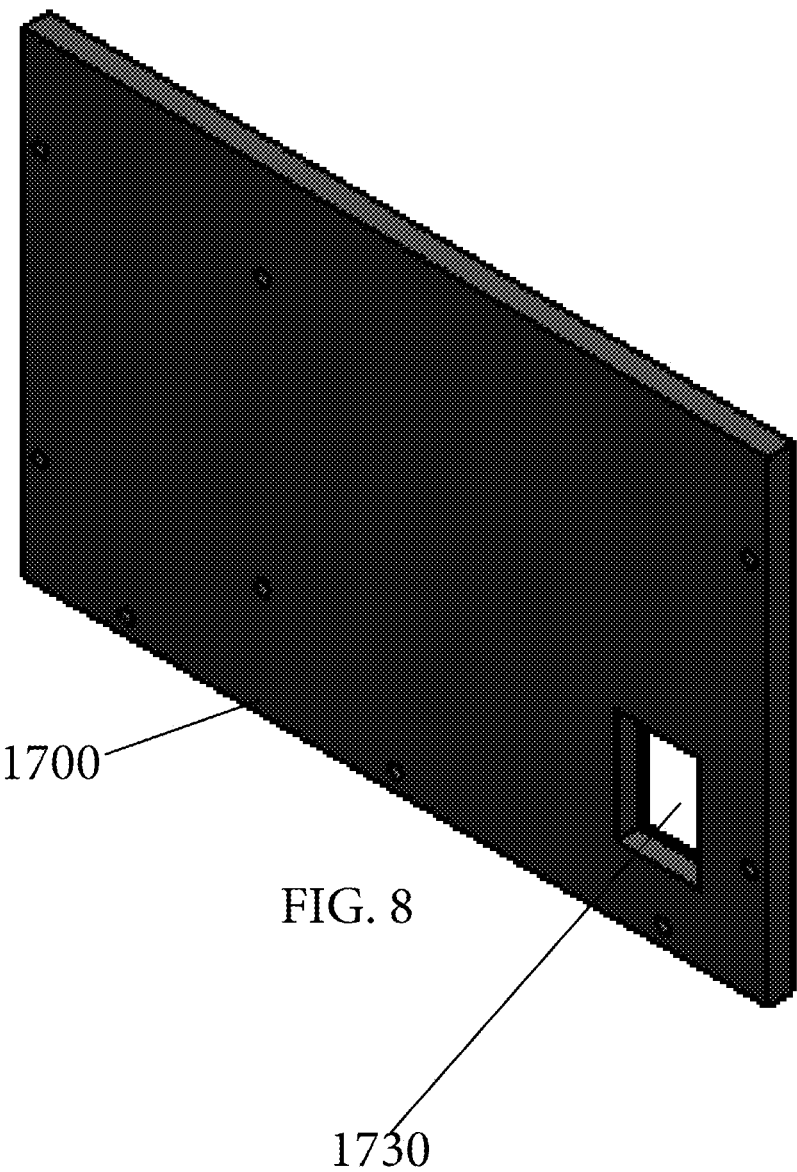
FIG. 8 is a perspective view of a rear plate 1700 of the plant stripper 1000.
Figure 8A:
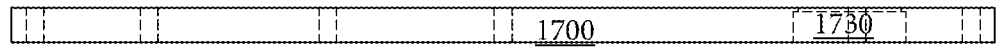
FIG. 8A is a side view of the rear plate 1700.
Figure 8B:
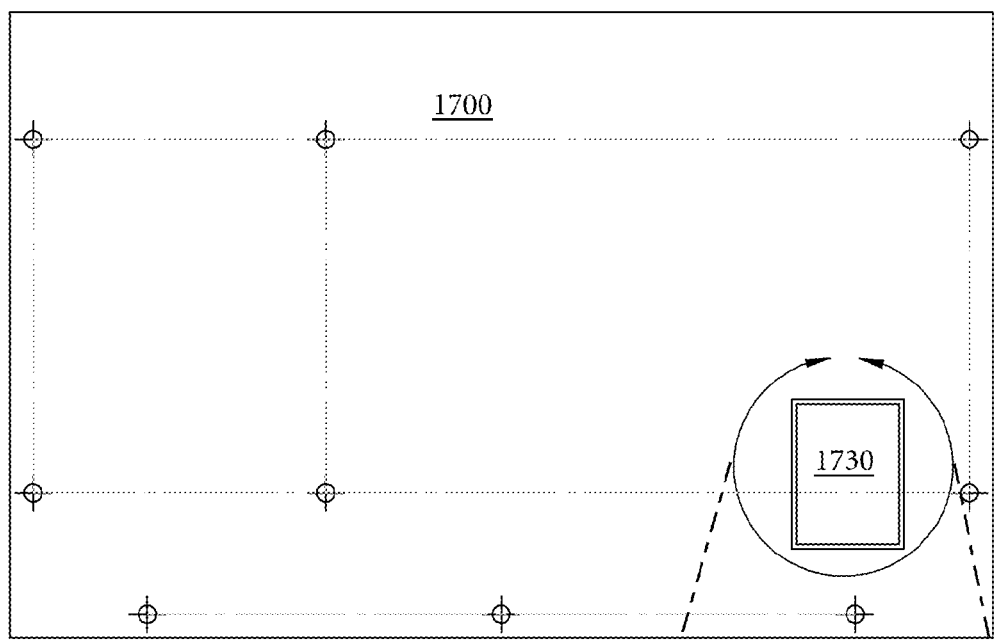
FIG. 8B is a top view of the rear plate 1700.
Figure 8D:
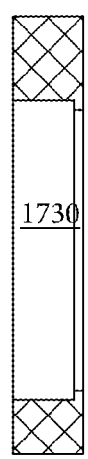
FIG. 8D is a cross-section of the relay hole 1730.
Figure 8C:
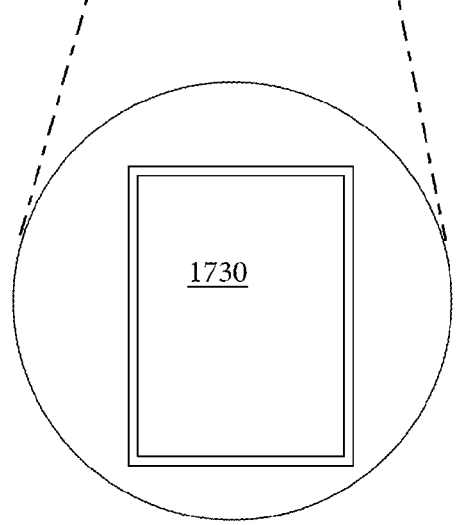
FIG. 8C is a zoom-in view of the relay hole 1730.

FIG. 8 is a perspective view of a rear plate 1700 of the plant stripper 1000. FIG. 8A is a side view of the rear plate 1700. FIG. 8B is a top view of the rear plate 1700. FIG. 8C is a zoom-in view of the relay hole 1730. As shown, various holes may be provided to the plate 1700 to accommodate screws. Suitably, the dimensions of the plate 1700 may be 6.69 inches by 10.50 inches by 0.38 inches. Suitably, a square relay hole 1730 may be cut through the plate 1700. As shown in FIG. 8C, the dimensions of the relay hole 1730 may suitably be 1.50 inches by 1.10 inches. In a preferred embodiment, the hole may be used to pass a power cord or other power supply through the plate 1700 to the motor 3000 (see FIGS. 1 and 1A).

Figure 9:
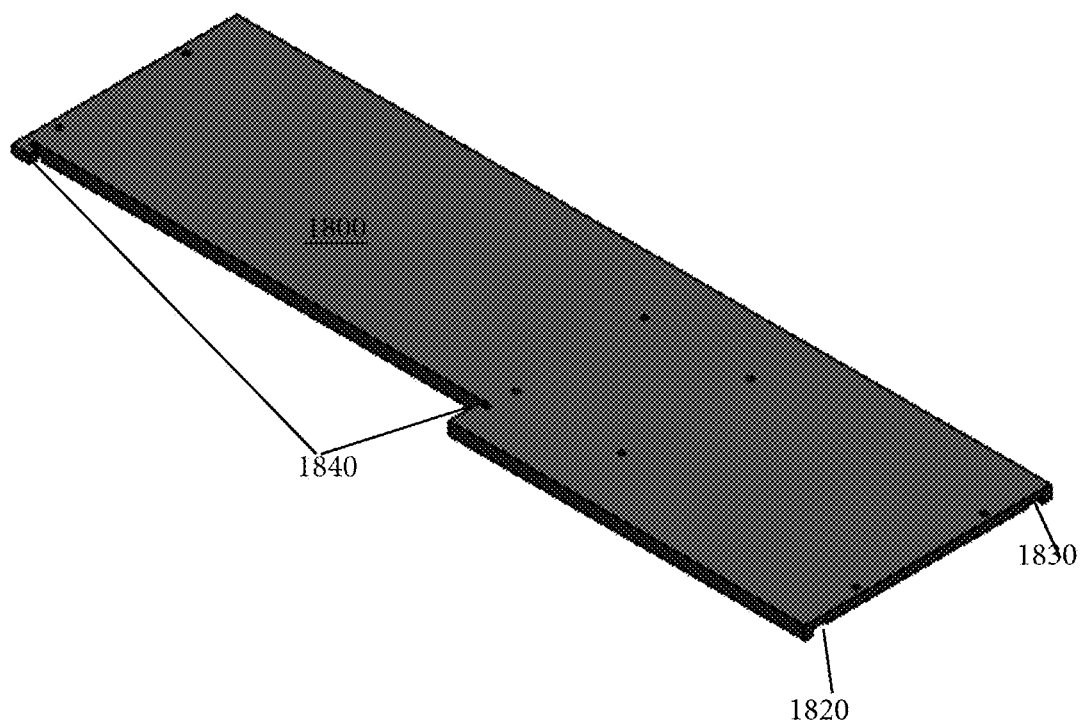
FIG. 9 is a perspective view of a top plate 1800 of the plant stripper 1000.

FIG. 9 is a perspective view of a top plate 1800 of the plant stripper 1000. FIG. 9A is a top view of the top plate 1800. FIG. 9B is a zoom-in view of the face plate groove 1840. FIG. 9C is another zoom-in view of the face plate groove 1840. FIG. 9D is a side view of the top plate 1800. FIG. 9E is a zoom in view of a right inside plate groove 1850. FIG. 9F is a side view of the tope plate 1800. As shown in the figures, the top plate 1800 may generally be rectangular slab. In a preferred embodiment, the slab is 7.25 inches wide by 24.00 inches long by 0.38 inches thick. Suitably, a front plate groove 1820 may be carved into the front left of the top plate 1800, a rear plate groove 1830 may be carved into the rear left of the plate 1800, a face plate groove 1840 may be cut out of the front right of the plate 1800, a right outside plate groove 1850 may be carved into the right end of the top plate 1800, a right inside plate groove 1860 may be carved into midsection of the top plate 1800, a left inside plate groove 1870 may be carved into another midsection of the top plate 1800, and a left outside plate groove 1880 may be carved into the left end of the plate 1800. Suitably, each of the grooves 1820, 1830, 1850, 1860, 1870 and 1880 may be 0.50 inches wide and 0.13 inches deep. In one embodiment, the right inside plate groove 1130 is 13.50 inches from the center of the right outside plate groove 1120 and the left inside plate groove 1140 is 3.13 inches from the right inside plate groove 1130. As discussed later, the grooves 1820, 1830, 1850, 1860, 1870, 1880 are configured to receive their corresponding plates 1200, 1300, 1400, 1500, 1600, 1700 in the manner of a tongue and groove fit. As shown, the grooves 1820, 1830, 1850, 1860, 1870, 1880 and plates 1200, 1300, 1400, 1500, 1600, 17000 may feature cooperating holes for the passing of screws to bolt the base to the plates 1200, 1300, 1400, 1500, 1600, 1700 in the grooves 1820, 1830, 1850, 1860, 1870, 1880. Suitably, the front plate groove 1230 of the right outside plate 1200, the front plate groove 1330 of the right inside plate 1300, and the front plate groove 1840 of the top plate are configured to align when the housing is assembled 1010, so that the front plate 1900 can pass into and out of the grooves 1230, 1330, 1840 at once to be supported by the assembled housing 1010.

Figure 10:
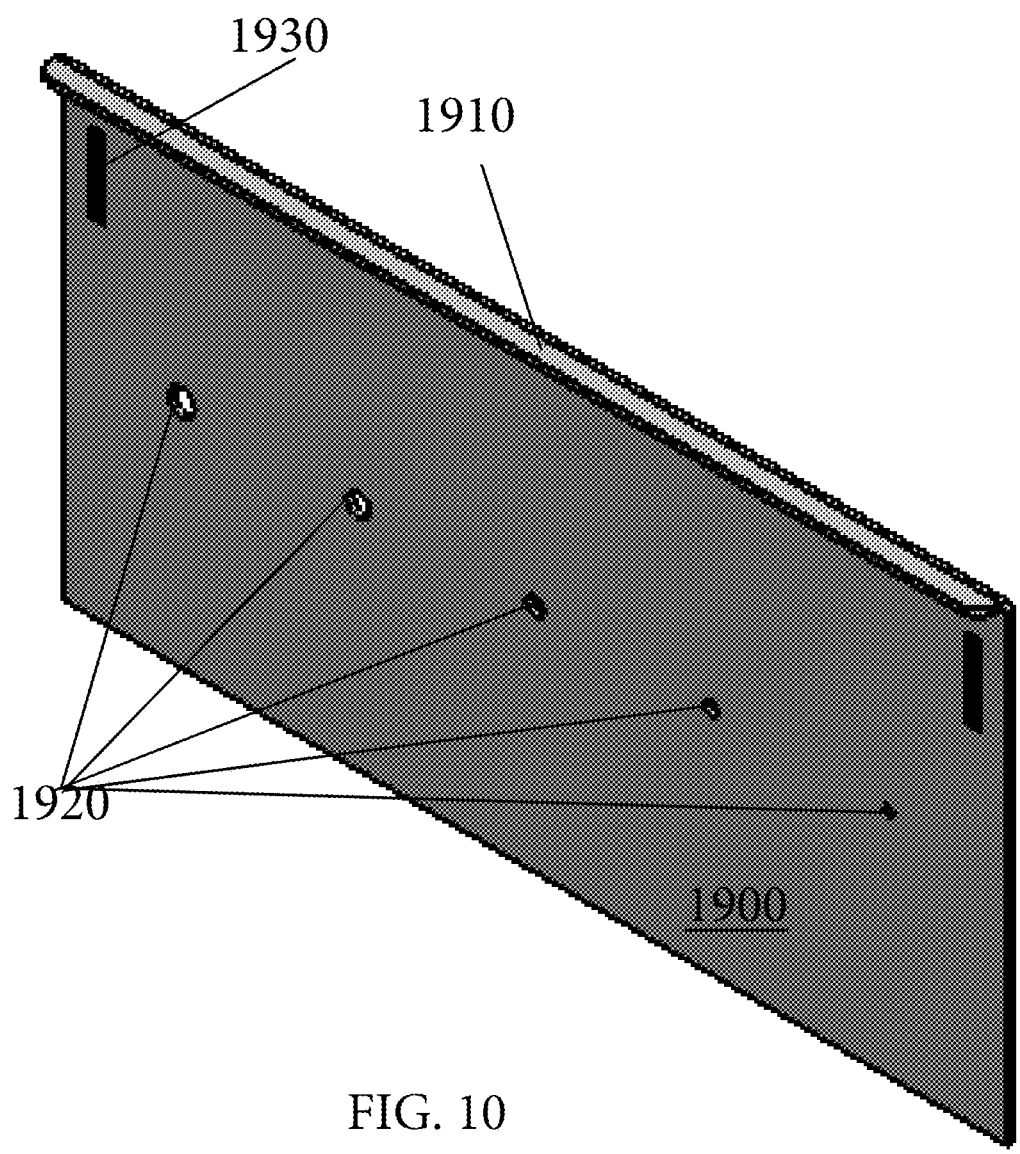
FIG. 10 is a perspective view of a face plate 1900 of the plant stripper 1000.
Figure 11:
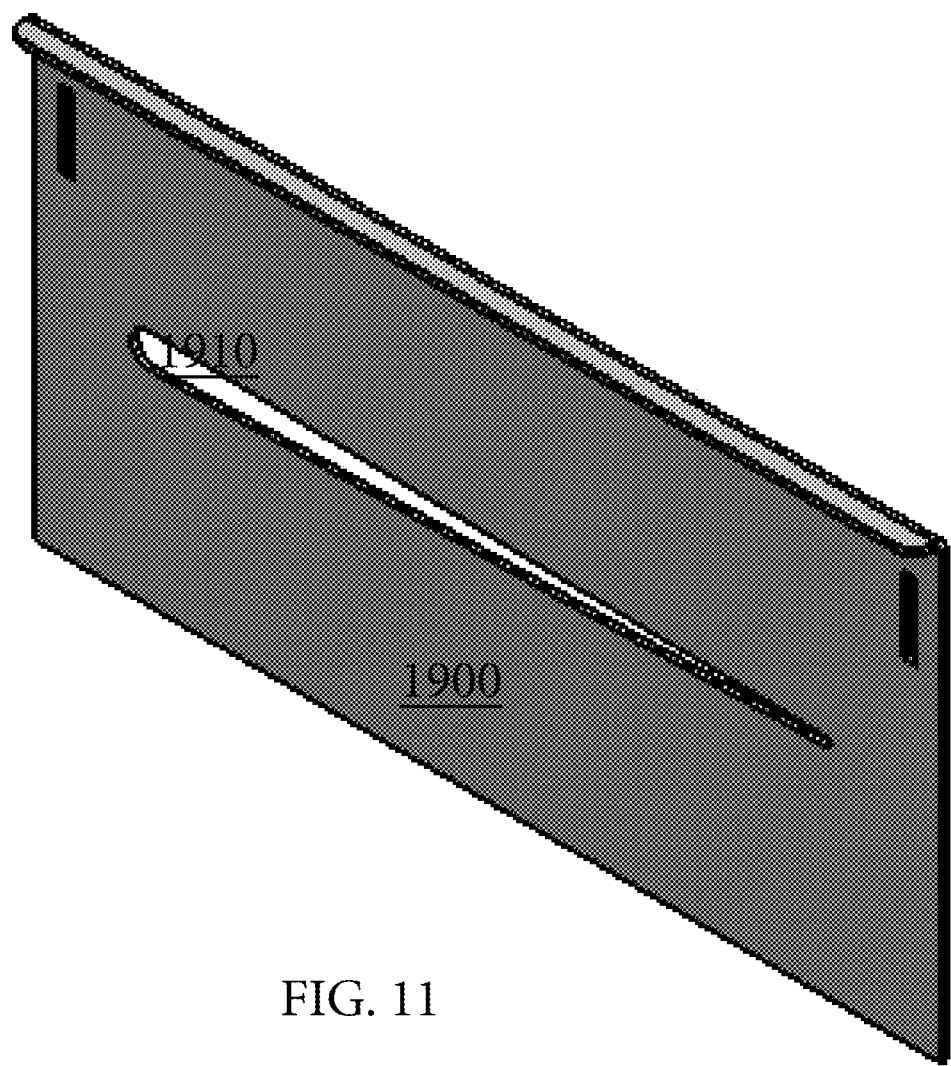
FIG. 11 is a perspective view of an alternate embodiment of the face plate 1900.
Figure 11A:
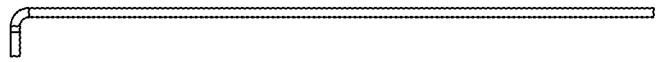
FIG. 11A is a side view of the face plate 1900 of FIG. 11.

FIG. 10 is a perspective view of a face plate 1900 of the plant stripper 1000. FIG. 10A is a side view of the face plate 1900. FIG. 10B is a front view of the face plate 1900. FIG. 11 is a perspective view of an alternate embodiment of the face plate 1900. FIG. 11A is a side view of the face plate 1900 of FIG. 11. As shown, the face plate is a thin sheet of material configured with a plant hole 1910, a lip 1920, and a tray catch 1930. In use the face plate 1900 is configured to slide into and out of the housing 1010 (see FIG. 1). As shown in FIG. 10, the face plate may feature a plurality of variously gauged plant holes 1910 to accommodate plant stems of varying gauges. As shown in FIG. 11, instead of the varying sized holes shown in FIG. 10, the face plate 1900 may feature an elongated and tapered hole 1910 for the same purpose. In one embodiment, the face plate 1900 is constructed of a 7.03 inch by 13.38 inch by 0.13 inch stainless steel plate where the lip 1920 is accomplished by folding the plate 0.42 inches over its length.

Figure 11B:
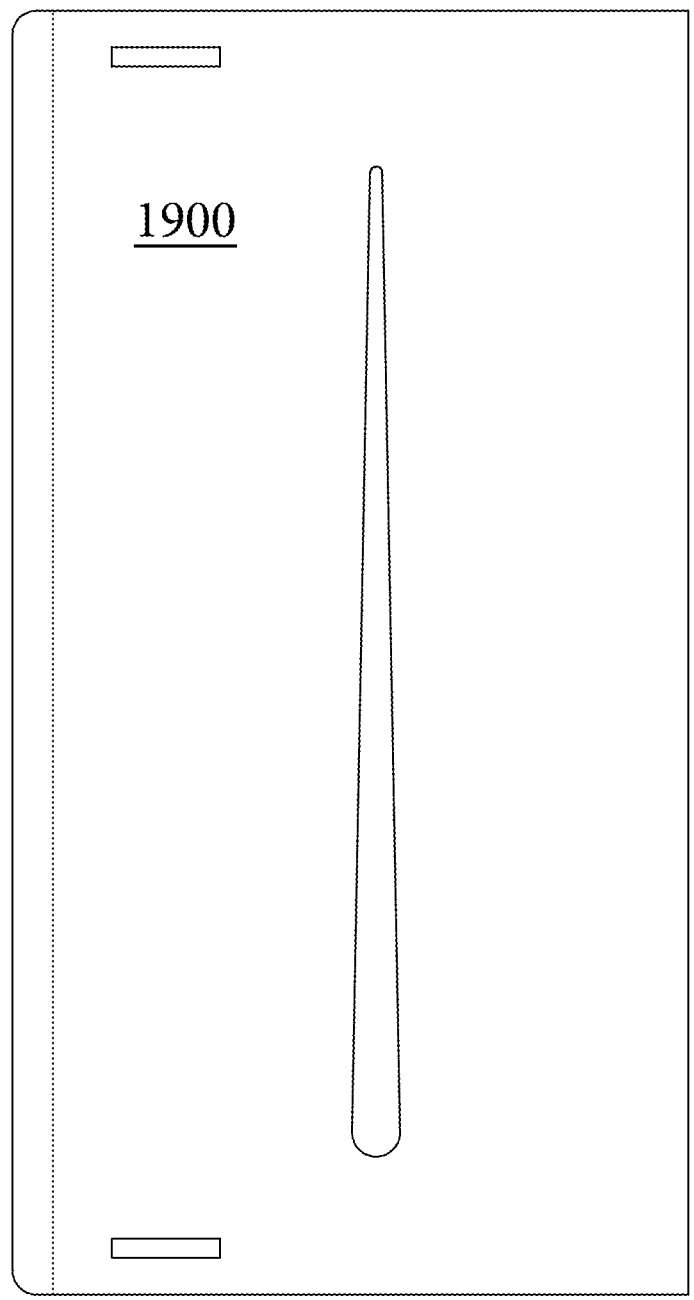
FIG. 11B is a front view of the face plate 1900 of FIG. 11.
Figure 12:
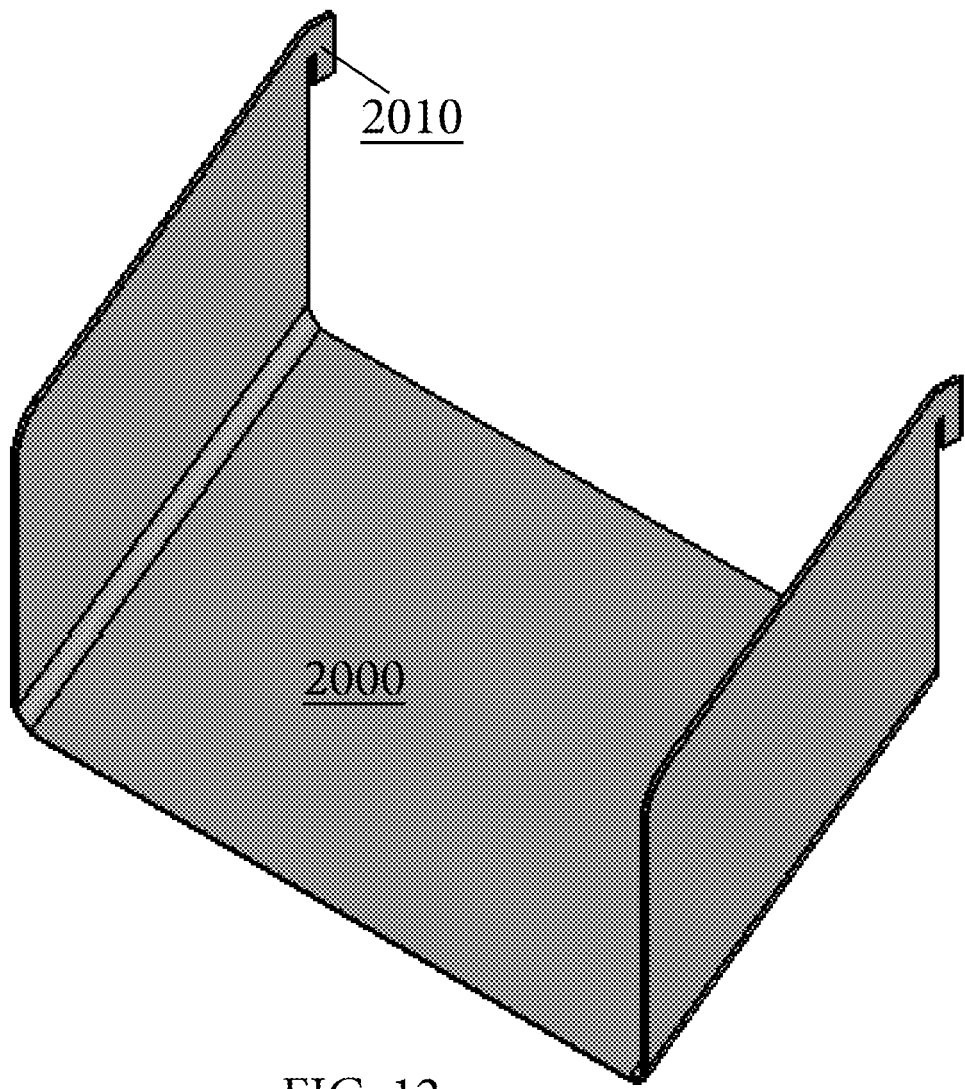
FIG. 12 is a perspective view of a guide tray 2000 of the plant stripper 1000.
Figures 12A, 12B:
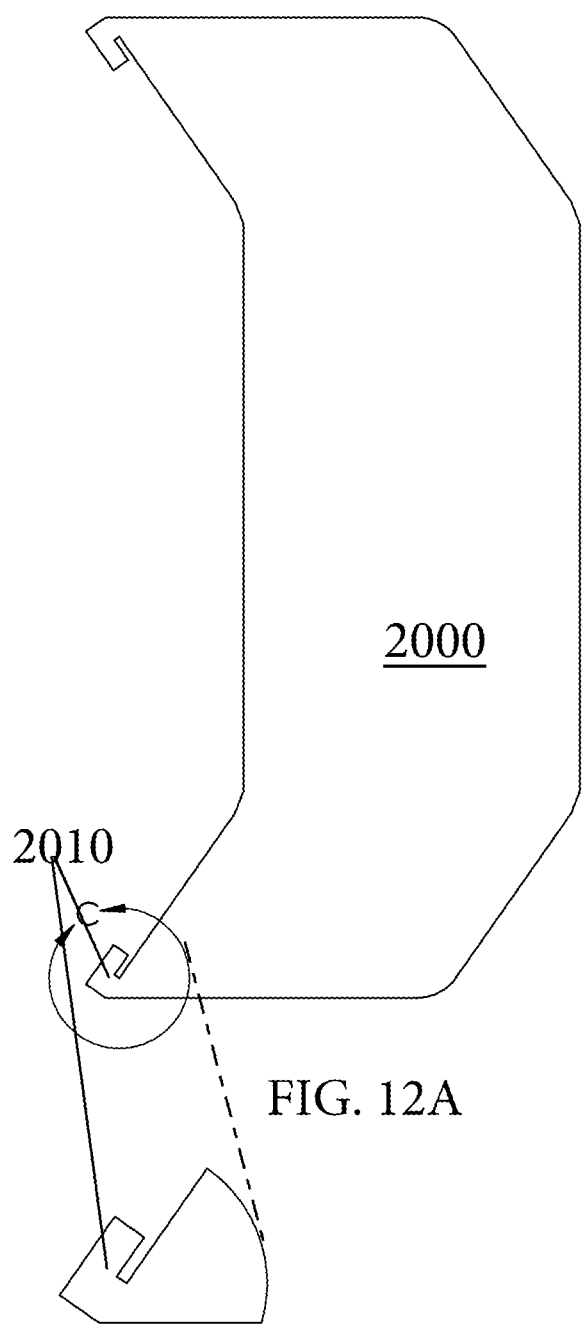
FIG. 12A is a top view of the guide tray 2000.
FIG. 12B is a zoom-in view of the face plate hook 2010 of the guide tray 2000.

FIG. 11B is a front view of the face plate 1900 of FIG. 11. FIG. 12 is a perspective view of a guide tray 2000 of the plant stripper 1000. FIG. 12A is a top view of the guide tray 2000 in an unfolded configuration. FIG. 12B is a zoom-in view of the face plate hook 2010 of the guide tray 2000. As shown, the guide tray may be a piece of 14g stainless steel sheet with wings that angle off at 35.00 degrees. Suitably, the wings feature hooks 1210 that may be applied to the tray catch 1930 of the face plate 1900 (see FIG. 1).

FIG. 13 is a perspective view of a gear 3700 of the plant stripper 1000. FIG. 13A is a front view of the gear 3700. FIG. 13B is a rotated view of the gear 3700. FIG. 13C is a cross-section of the gear 3700. FIG. 13D is a zoom-in view of the gear 3700. As shown, the gear 3700 features a keyhole and tongue 3710 and teeth. Suitably, the gear may be a 0.50 inch thick 20T aluminum spur gear with teeth positioned every 9.00 degrees from tooth trough to tooth peak and where the tooth troughs are 7.29 degrees. Suitably, the addendum of the gear is 2.89 inch diameter, the pitch diameter is 2.62 inches, and the dendum diameter is 2.30. In one embodiment, the diametral pitch is 7.625, the number of teeth is 20, the pressure angle is 20 degrees, the clearance is 0.032786, the dp is 2.62295 and the dp base is 2.46477. In a preferred embodiment, the key hole and tongue 3710 is 0.626 diameter with the tongue being 0.170 inch by 0.08 inch and where the keyway is collinear with the center of the tongue 3710. As shown in FIG. 13B, the tongue 3710 is 12.65 degrees from the center of one of the teeth.

Figure 14:
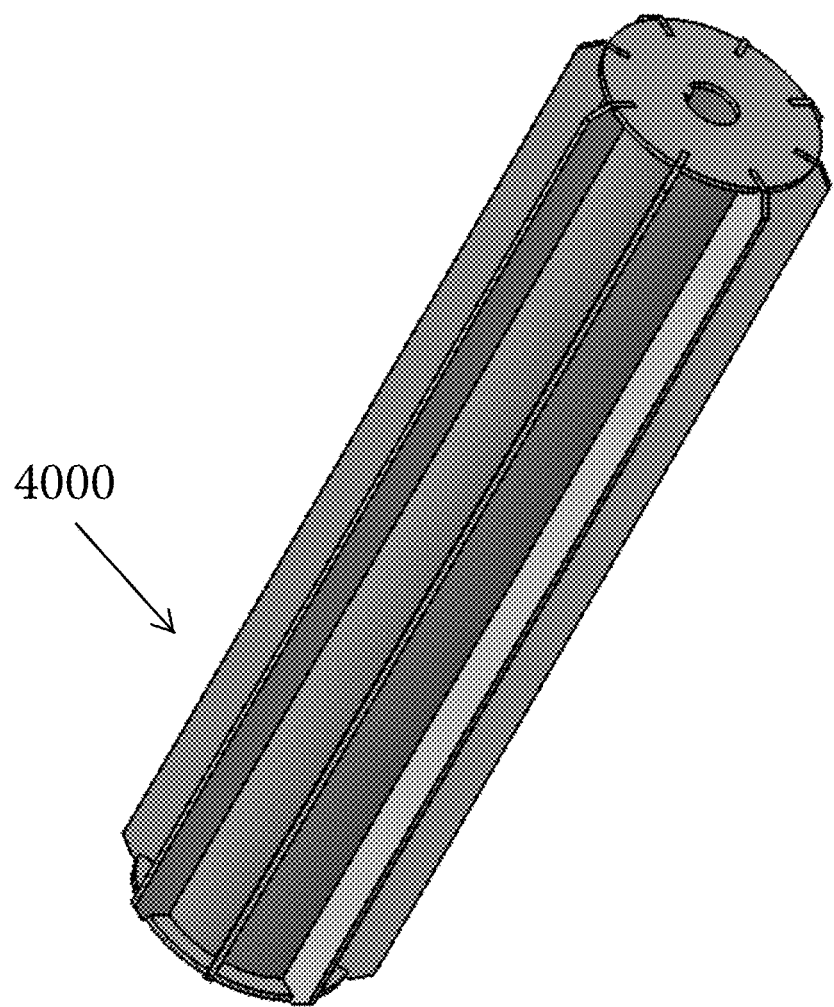
FIG. 14 is a perspective view of a roller 4000 of the plant stripper 1000.
Figure 14A:
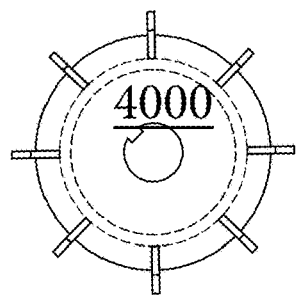
FIG. 14A is a top view of the roller 4000.
Figures 14B, 14C:
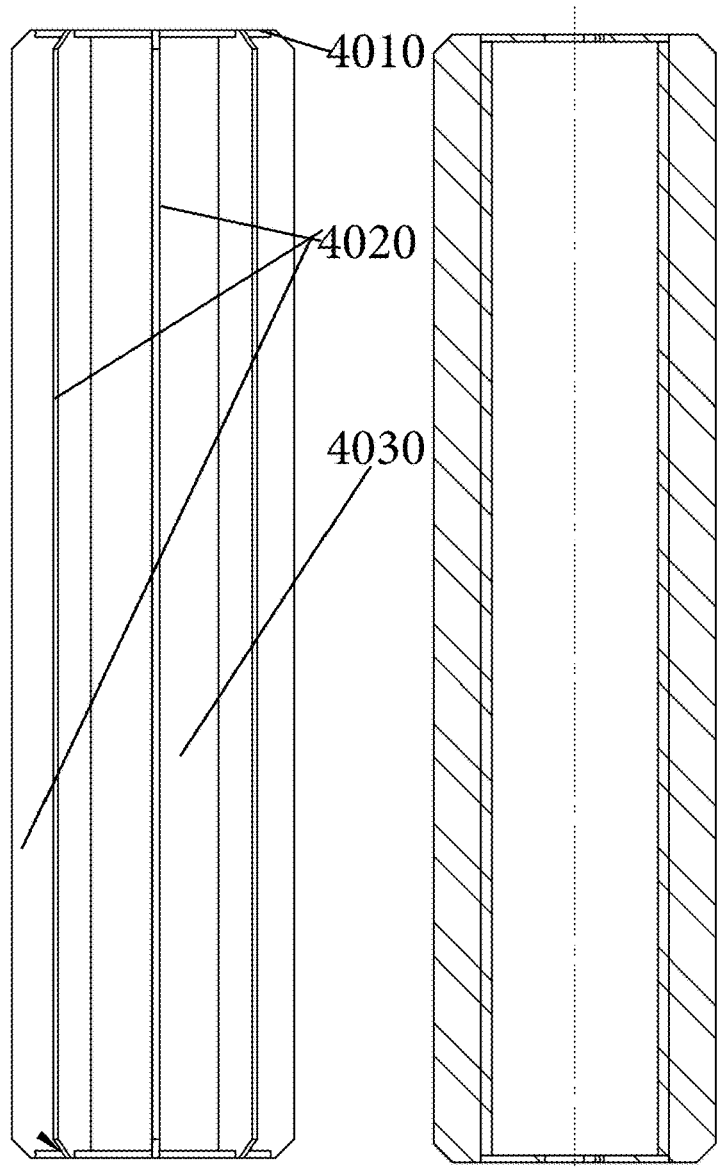
FIG. 14B is a side view of the roller 4000.
FIG. 14C is a cross section view of the roller 4000.
Figure 15:
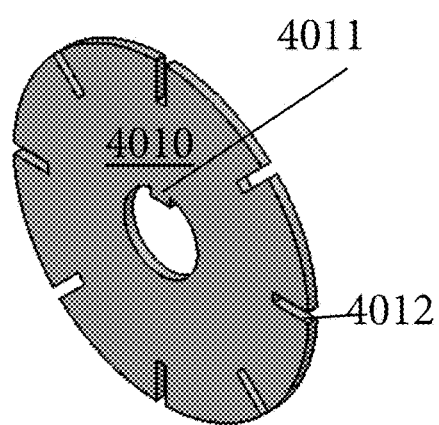
FIG. 15 is a perspective view of an end cap 4010 of the roller 4000.
Figure 15B:
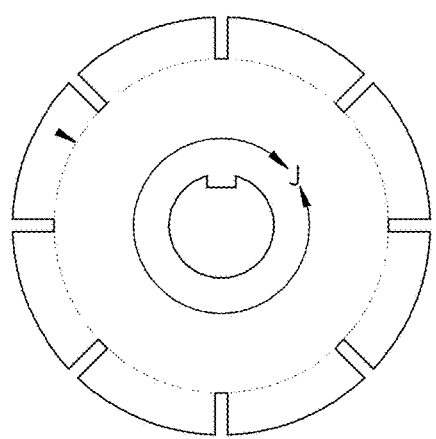
FIG. 15B is a top view of the end cap 4010.
Figure 15A:
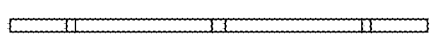
FIG. 15A is a side view of the end cap.
Figure 15C:
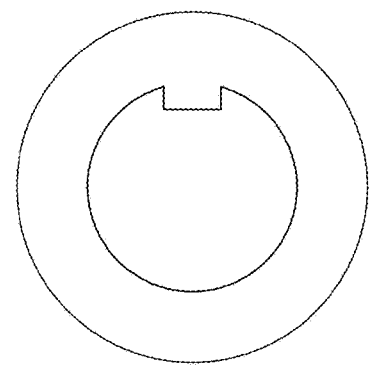
FIG. 15C is a zoom-in view of the shaft tongue 4011 of the end cap 4010.

FIG. 14 is a perspective view of a roller 4000 of the plant stripper 1000. FIG. 14A is a top view of the roller 4000. FIG. 14B is a side view of the roller 4000. FIG. 14C is a cross section view of the roller 4000. As shown, the roller 4000 is defined by an end plate 4010, blades 4020, and a pipe 4030. FIG. 15 is a perspective view of an end cap 4010 of the roller 4000. FIG. 15A is a side view of the end cap. FIG. 15B is a top view of the end cap 4010. FIG. 15C is a zoom-in view of the shaft tongue 4011 of the end cap 4010. FIG. 16 is a perspective view of a blade 4020 of the roller 4000. FIG. 16A is a side view of the blade 4020. FIG. 16B is a front view of the blade 4020. Referring back to FIG. 14A, the blades end caps 4010 are attached to the ends of the pipe and feature grooves 4012 for accepting the blades 4020 and positioning the same every 45 degrees radially around the pipe 4030. In a preferred embodiment, the end caps 4010 feature a key hole and tongue 4011. When assembled, the rollers 4000 may be welded and are 12.00 inches long with a 3.00 inch diameter. Preferably, the pipe 4030 may be stainless steel tubing of 2.00 diameter by 11.85 inch length. The end caps 4010 may be 0.07 inches thick and stainless steel with a 2.5 inch diameter. The blades may be 14G stainless steel, 12 inches in length, 0.07 inches thick and 0.5 inches wide. Suitably, the spacing of the blades 4020 on the roller 4000 at every 45 degrees around the roller 4000 may be important to clogging of the rollers when plants are passed therethrough.

Figure 17:
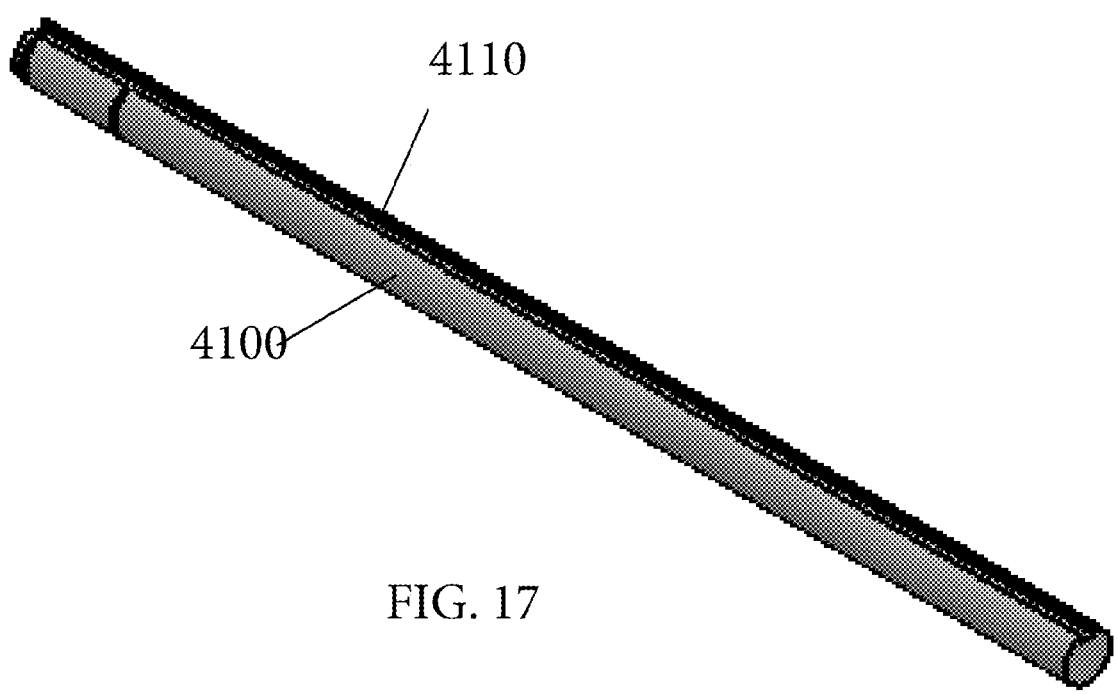
FIG. 17 is a perspective view of an upper 4100 or lower 4200 shaft of the plant stripper 1000.

FIG. 17 is a perspective view of an upper 4100 or lower 4200 shaft of the plant stripper 1000. FIG. 17A is a side view of the lower shaft 4200. FIG. 17B is a zoom-in view of the lower shaft 4200. FIG. 17D is a side view of the upper shaft 4100 of the plant stripper 1000. FIG. 17E is an end view of the upper or lower shaft 4100/4200. As shown, the shaft 4100 is a rod with a groove 4110 and is configured for coaxial insertion to the rollers 4000 (not shown in FIGS. 17 through 17D) and gear 3700 so that the groove interacts with the key hole and tongue 4011/3710 of the roller 4000 and gear 3700 whereby mechanical motion of the gear 3700 is transferred to the rollers 4000.

Figure 18:
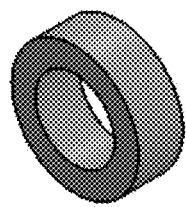
FIG. 18 is a perspective view of a spacer 4400 of the plant stripper 1000 and, FIG. 19 is a basic flow of operation of the plant stripper 1000.

FIG. 18 is a perspective view of a spacer 4400 of the plant stripper 1000. The spacers are configured to assist in the rotation of the roller 4000 when positioned in the housing 1010 (FIG. 1).

Figure 19:
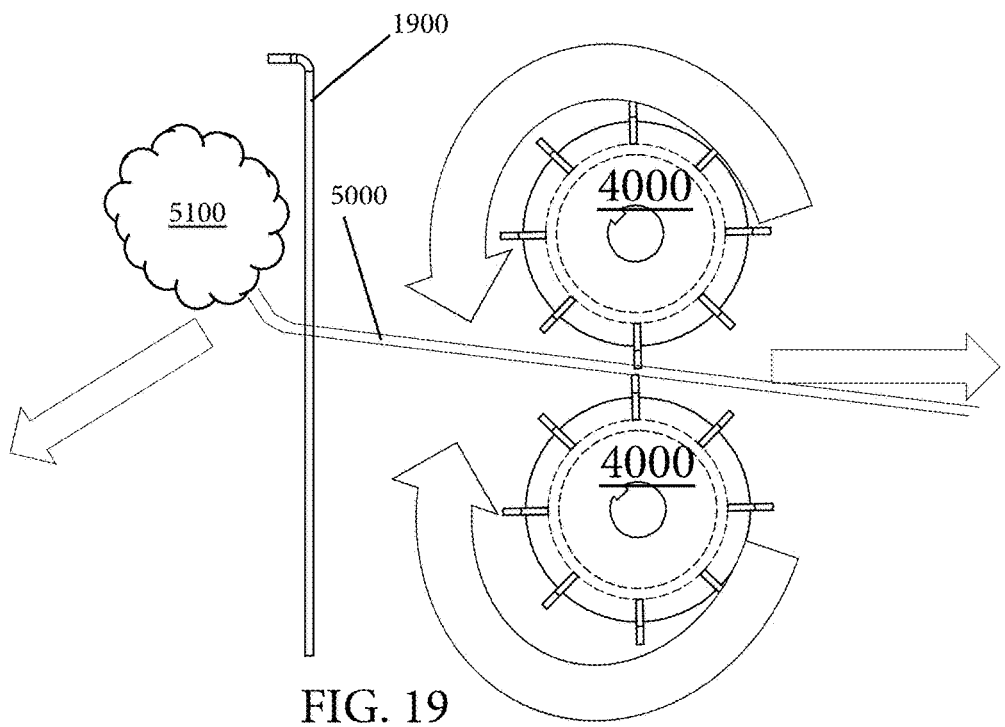

Referring back to FIGS. 1 and 1A, the plant stripper 1000 can be used for separating buds (not shown) or fruit (not shown) from the stems or branches of a plant (not shown). In one embodiment, the plant stripper 1000 is defined by a housing 1010 that contains a face plate 1900, bladed rollers 4000, and motor 3000 and gear system 3700 for counter turning the rollers 4000. Mechanical motion of the motor is imparted through the right inside plate 1400 by interaction of coupling 3200 connected to (a) the distal end of the motor 3000 through motor hole 1410 and (b) the distal end of the lower shaft 4200 passing through the lower aperture of the right inside plate 1300. Suitably, the mechanical motion of the motor is imparted from the lower shaft to the lower roller 4000 via the key hole and tongue 4011. Counter motion of the top roller is provided by the mechanical motion of the motor via gears 37 and the upper rod 4100. A basic diagram of a preferred mode of operation of the stripper 1000 is provided in FIG. 19. In operation, a plant stem (5000) bearing buds (5100) or fruit (not shown) may be provided through a plant hole 1910 in the face plate 1900 and gripped by the counter turning rollers 4000 so that continued counter turning of the rollers pulls the stems or plants through the plant hole 1910 of the face plate 1900. Suitably, the plant hole 1910 is gauged so that only the stem (5000) may pass through the hole 1910 but not the buds (5100) or fruit (not shown) whereby the buds (5100) or fruit (not shown) of the plant (5000) are stripped from the plant (5000) via action of the stem (5000) through the plant hole 1910. In one embodiment, the plant stripper 1000 features a guide tray 2000 for catching stripped buds or fruit and guiding the same to a collection bin.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:

1. Apparatus for separating buds or fruit from the stems or branches of a plant, said apparatus comprising:
    a housing
    a face plate supported by the housing, where said face plate features a plant hole that is sized to receive a stem or branch of a plant but not a bud or fruit of said plant;
    two bladed rollers disposed in the housing wherein
        (a) each of the two bladed rollers are defined by a shaft with a shaft groove;
        a pipe,
            two end caps where each end cap is defined by a disc with a shaft tongue and eight grooves equiradially provided around the periphery of the disc, and
            eight blades,
        (b) the two end caps are positioned on separate ends of the pipe,
        (c) wherein each of the eight blades are accepted in one of the grooves on each end cap so that each of the eight blades are positioned lengthwise and radially in a line along the length of the pipe between the two end caps, and
        (d) the shaft is coaxially provided to the pipe so that the shaft tongue of each end cap is disposed in the shaft groove of the shaft;
    a motor and gear system wherein
        (i) the gear system is defined by two gears that are each defined by a disk with gear teeth and a gear tongue,
        (ii) the gear teeth of each gear are interfaced so that turning one gear will counterturn the other gear,
        (iii) the motor is configured to turn one of the gears, and (iv) the gear tongue of one gear is disposed in the shaft groove of the shaft of one bladed roller while the gear tongue of the other gear is disposed in the shaft groove of the shaft of the other bladed roller;

wherein the motor and gear system is turned on for counter turning said two bladed rollers so that (a) a stem or branch provided through the plant hole is gripped between the bladed rollers when counter turned by the motor and gear system, (b) the stem or branch is pulled through the plant hole by the counter turning bladed rollers, (c) the fruit or bud is detached from the stem or branch when the stem or branch is passed through the plant hole in the face plate;

a guide tray defined by a sheet with wings that each have a hook; and, wherein said face plate features a tray catch where the hooks are applied to hang the guide tray from the face plate outside the housing so that a detached bud or fruit is guided by the guide tray into a collection of buds or fruits.

2. The apparatus of claim 1 wherein the blades are rigid and positioned at 45 degrees radially relative to each other around the pipe.

3. A method of separating buds or fruit from the stems or branches of a plant, said method comprising the steps of:
   (a) obtaining a stem or branch of a plant that has a bud or a fruit;
   (b) locating an apparatus, said apparatus comprising:
      a housing,
      a face plate supported by the housing, where said face plate features a plant hole that is sized to receive the stem or branch of the plant but not the bud or fruit of said plant,
      two bladed rollers disposed parallel relative to each other in the housing, wherein
         (i) each of the two bladed rollers are defined by a shaft with a shaft groove;
         a pipe,
         two end caps where each end cap is defined by a disc with a shaft tongue and eight grooves equiradially provided around the periphery of the disc, and
         eight blades,
         (ii) the two end caps are positioned on separate ends of the pipe,
         (iii) wherein each of the eight blades are accepted in one of the grooves on each end cap so that each of the eight blades are positioned lengthwise and radially in a line along the length of the pipe between the two end caps, and
         (iv) the shaft is coaxially provided to the pipe so that the shaft tongue of each end cap is disposed in the shaft groove of the shaft,
      a motor and gear system wherein
         (1) the gear system is defined by two gears that are each defined by a disk with gear teeth and a gear tongue,
         (2) the gear teeth of each gear are interfaced so that turning one gear will counterturn the other gear,
         (3) the motor is configured to turn one of the gears, and
         (4) the gear tongue of one gear is disposed in the shaft groove of the shaft of one bladed roller while the gear tongue of the other gear is disposed in the shaft groove of the shaft of the other bladed roller
      said motor and gear system for counter turning said two bladed rollers;
   (c) operating the motor and gear system to counter turn said two bladed rollers;
   (d) providing the stem or branch through the plant hole;
   (e) gripping the stem by and between the bladed rollers when counter turned by the motor and gear system,
   (f) pulling the stem or branch through the plant hole by the counter turning bladed rollers; and,
   (g) detaching the fruit or bud from the stem or branch when the stem or branch is passed through the plant hole in the face plate.

4. The method of claim 3 wherein the blades are rigid and positioned at 45 degrees radially relative to each other around the pipe.

5. The method of claim 4 where the apparatus further comprises:
   a guide tray defined by a sheet with wings that each have a hook; and,
   wherein said face plate features a tray catch where the hooks are applied to hang the guide tray from the face plate outside the housing so that a detached bud or fruit is guided by the guide tray into a collection of buds or fruits.

* * * * *